United States Patent [19]

Tanii et al.

[11] Patent Number: 5,258,799
[45] Date of Patent: Nov. 2, 1993

[54] AUTO FOCUS CAMERA WITH PSEUDO FOCAL LENGTH MODE

[75] Inventors: Junichi Tanii, Izumi; Masaaki Nakai, Kawachinagano; Hiroyuki Okada; Hiroshi Ootsuka, both of Sakai; Shigeru Wada, Kishiwada; Kohtaro Hayashi, Hirakata; Hiroshi Ueda, Habikino, all of Japan

[73] Assignee: Minolta Camera Kabushiki Kaisha, Osaka, Japan

[21] Appl. No.: 850,971

[22] Filed: Mar. 11, 1992

[30] Foreign Application Priority Data

| Mar. 12, 1991 | [JP] | Japan | 3-073864 |
| Mar. 12, 1991 | [JP] | Japan | 3-073865 |
| Mar. 12, 1991 | [JP] | Japan | 3-073866 |
| Mar. 14, 1991 | [JP] | Japan | 3-075688 |
| Mar. 14, 1991 | [JP] | Japan | 3-075689 |
| Mar. 14, 1991 | [JP] | Japan | 3-075690 |
| Mar. 14, 1991 | [JP] | Japan | 3-075691 |

[51] Int. Cl.⁵ .............................. G03B 13/36
[52] U.S. Cl. ............................ 354/402; 354/195.1
[58] Field of Search .............. 354/432, 400, 402, 406, 354/407, 408, 195.1, 219, 105

[56] References Cited

U.S. PATENT DOCUMENTS

| 4,583,831 | 4/1986 | Harvey . | |
| 4,639,111 | 1/1987 | Harvey . | |
| 4,688,919 | 8/1987 | Ogawa et al. . | |
| 4,774,536 | 9/1988 | Inoue et al. . | |
| 4,780,735 | 10/1988 | Taniguchi et al. . | |
| 4,855,780 | 8/1989 | Hayakawa | 354/432 |
| 4,904,854 | 2/1990 | Ishida et al. . | |
| 4,951,075 | 8/1990 | Tokumaru et al. | 354/195.1 |
| 4,962,400 | 10/1990 | Otani et al. | 354/195.1 |
| 5,014,078 | 5/1991 | Kudo et al. | 354/195.1 |
| 5,051,767 | 9/1992 | Honman et al. . | |
| 5,097,279 | 3/1992 | Sakamoto et al. . | |
| 5,103,251 | 4/1992 | Kudo | 354/195.1 |
| 5,130,733 | 7/1992 | Taniguchi et al. . | |

FOREIGN PATENT DOCUMENTS

| 63-17420 | 1/1988 | Japan . |
| 2-282732 | 11/1990 | Japan . |
| 2-306229 | 12/1990 | Japan . |

*Primary Examiner*—Russell E. Adams
*Attorney, Agent, or Firm*—Burns, Doane, Swecker & Mathis

[57] ABSTRACT

An auto focus camera includes a usual zoom lens and provides a pseudo focal length mode, in which the size of focus condition detecting area, to the photographing scene to be printed, is variable. A pseudo focal length is stored and a focus condition is detected in accordance with a ray of light passed through the zoom lens. When the camera is in such a mode as to continuously detect focus condition for keeping an object in focus, or to be operated when the contrast of the object whose focus condition is detected is low, the focal length of the zoom lens and the pseudo focal length are controlled respectively in accordance with the mode.

6 Claims, 27 Drawing Sheets

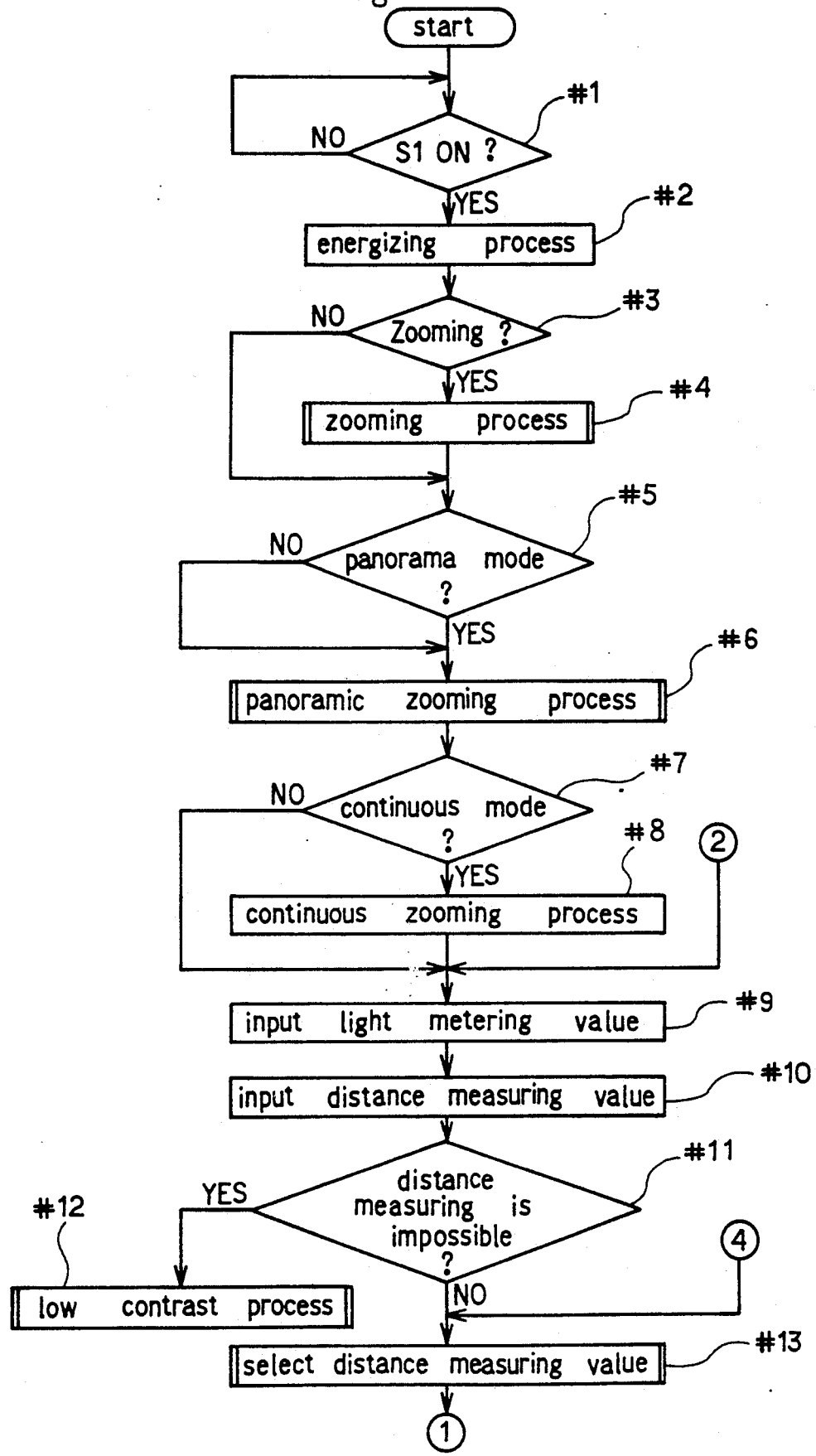

| camera shake amount | object moving vector | object distance | long distance ($A$ is small) | | short distance ($B$ is great) | |
|---|---|---|---|---|---|---|
| | | | high speed | low speed | high speed | low speed |
| small | ↓ | | small | small | medium | medium |
| middle | ↙ | | between small and medium | between small and medium | between medium and large | medium |
| large | ← | | medium | small | large | medium |

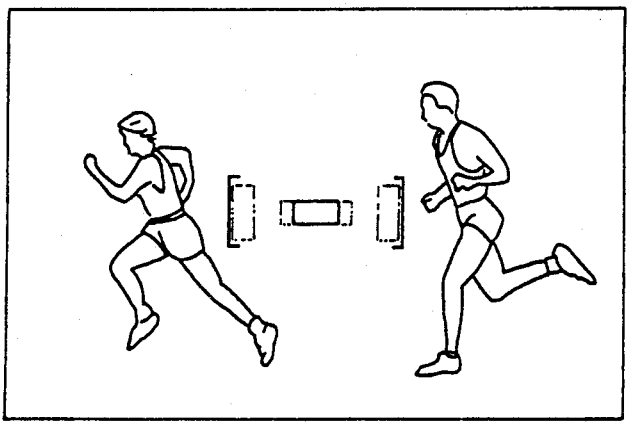
Fig. 24 (a)  fez=x1
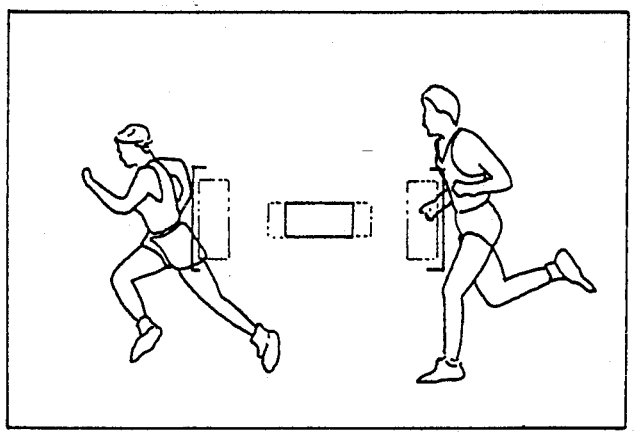
Fig. 24 (b)  fez=x1.4
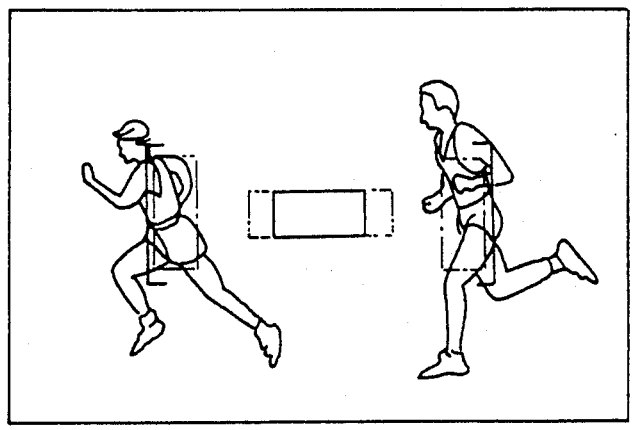
Fig. 24 (c)  fez=x2

AUTO FOCUS CAMERA WITH PSEUDO FOCAL LENGTH MODE

BACKGROUND OF THE INVENTION

The present invention relates to an auto focus camera having a usual zoom lens, and further, providing a pseudo focal length mode.

In a conventional auto focus camera, the size of a focus condition detecting area in a photographing scene is fixed. Accordingly, when an effective focus condition detecting value is not obtained in the focus condition detecting area, a method (so-called low contrast scan) is adopted in which the effective detecting value is searched by driving a focusing lens compulsorily. The method is effective when the detecting value is not obtained because of an excessive out of focus condition that is de-focus amount is too large. However, the method is not effective at finding the detecting value when the contrast of an object in the focus condition detecting area is too low.

Additionally, when the object is moving, or when a camera shake is occurring because the focal length of a photographing lens is too long, a problem arises in that a main object is located out of the focus condition detecting area.

Further, when a panoramic photo is carried out in which a horizontally longer range compared with usual photographing is photographed, there is a high possibility that the main object will be located in a corner position of the photographing scene rather than in a central position. With regard to this problem, the solution has not been fully considered.

SUMMARY OF THE INVENTION

The present invention seeks to resolve the above-mentioned problems.

An object of the present invention is to provide a camera capable of enlarging the focus condition detecting area automatically when a mode of operation is selected where a large focus condition detecting area is required.

Another object of the present invention is to provide a camera capable of varying the size of the focus condition detecting area in accordance with the condition of an object.

An auto focus camera according to the present invention achieves the above-mentioned object by controlling the focal length of a zoom lens and a pseudo focal length, respectively.

BRIEF DESCRIPTION OF THE DRAWINGS

FIGS. 24-a, 24-b, and 24-c are views showing that the distance measuring areas in a film frame are varied in size according to the pseudo zooming magnification (fez);

DETAILED DESCRIPTION OF THE EMBODIMENT

Figure 1:
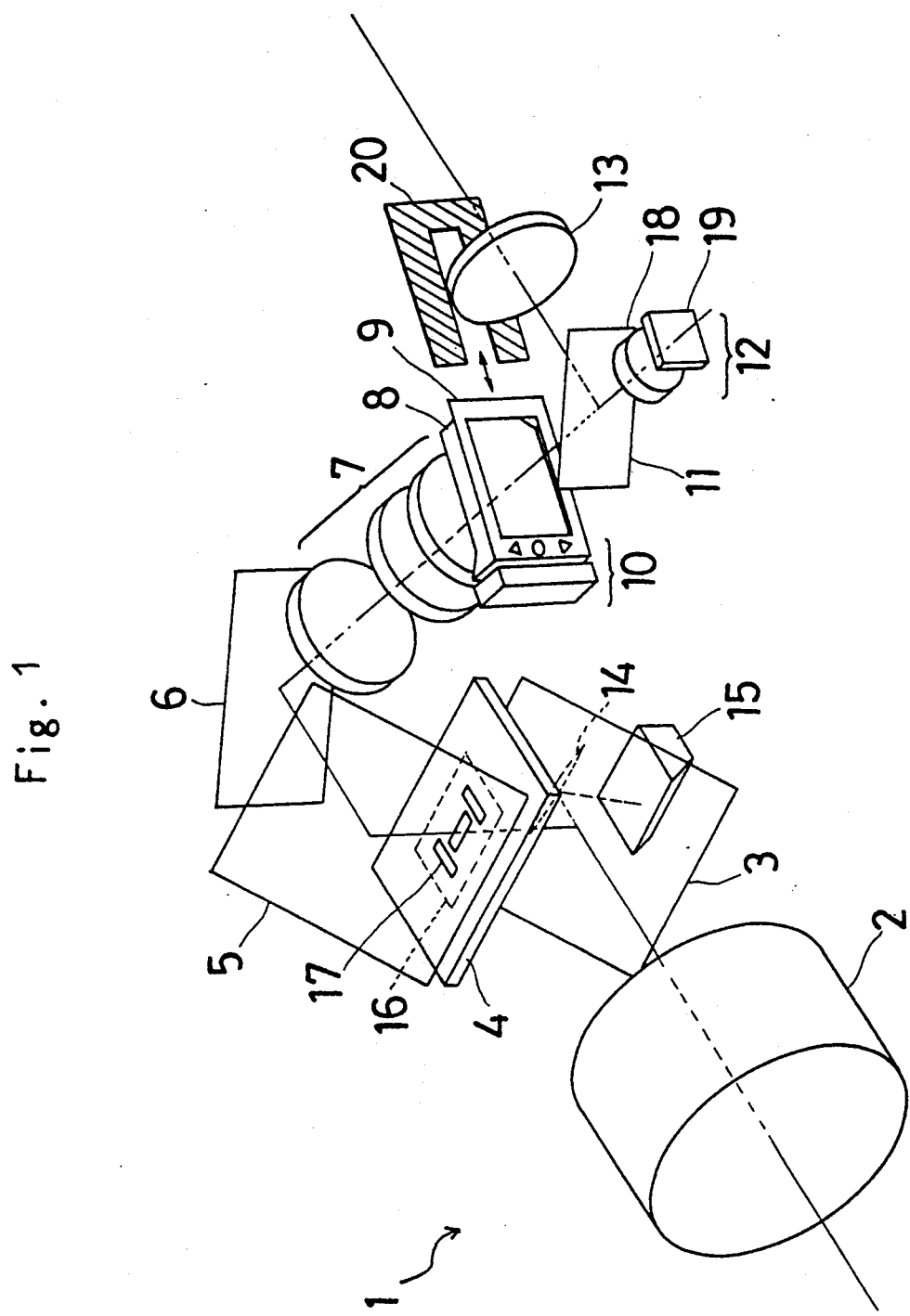
FIG. 1 is a schematic view of an optical system of a pseudo focal length photography camera according to an embodiment of the present invention.

One preferred embodiment of the present invention will be described in the form of a camera having a function of pseudo focal length photographing, referring to the accompanying drawings. FIG. 1 is a schematic view showing an optical system of the pseudo focal length photography camera, denoted by the numeral 1, of the present invention, in which there are provided a detachable photo lens unit 2, a main mirror 3, a focusing screen (primary image surface) 4, a mirror 5, a mirror 6, a relay lens unit 7, a condenser lens 8, a visual field frame (secondary image surface) 9, an in-finder optical system 10, a mirror 11, a light metering optical system 12, and an eyepiece lens unit 13. Also, an AF mirror 14 and an AF sensor module 15 are provided beneath the main mirror 3. The focusing screen 4 carries on its surface a pseudo focal length shooting area 16 defined by the dotted line in FIG. 1 and AF control areas 17 defined by the solid line.

The light metering optical system 12 comprises a light metering lens 18 and a light metering sensor 19. Also, a panoramic shooting shield 20 is arranged to be placed in the front of the visual field frame 9 for determining an effective shooting area during panoramic shooting.

In the arrangement shown in FIG. 1, a flux of light incident on the photo lens unit 2 is reflected on the main mirror 3 and focused on the focusing screen 4 (the primary surface) thus forming a full screen size image. A portion of the light from the photo lens unit 2 passes through the main mirror 3, which is a half mirror, to the AF sensor module 15 where an object distance is measured at the three AF control areas 17 on the primary image surface. The image on the primary image surface is projected through the two mirrors 5 and 6, the relay lens unit 7, and the condenser lens 8 onto the visual field frame (the secondary image surface) 9. The relay lens unit 7 is arranged to vary its magnification factor through lens movement and, at full screen size shooting, will project a full screen size image on the primary image screen to the visual field frame 9 at full scale.

The magnification of the relay lens unit 7 is increased as the pseudo-zooming magnification is set higher. It is assumed that when the pseudo-zooming magnification is 1.4×, the area (visual field area 16 in the pseudo focal length shooting) defined by the dotted line on the primary image surface becomes equal to the visual field frame 9. The image on the secondary image surface associated with the finder indications can be viewed through the mirror 11 and the eyepiece lens 13. The telephoto effect of a zoom lens of an SLR camera will be simulated by increasing the magnification of the relay lens unit 7 as the pseudo zooming magnification is set higher. As a result, the AF area 17, which remains unchanged in size at the primary image surface, will appear to be enlarged.

The mirror 11 is also a half mirror so that the image on the secondary image surface is projected through the light metering lens 18 onto the light metering sensor 19. The light metering area (each metering area in a divided brightness measuring) is uniform on the secondary image surface, regardless of the pseudo zooming, and can be maintained constant relative to the view field of a target.

Figure 2:
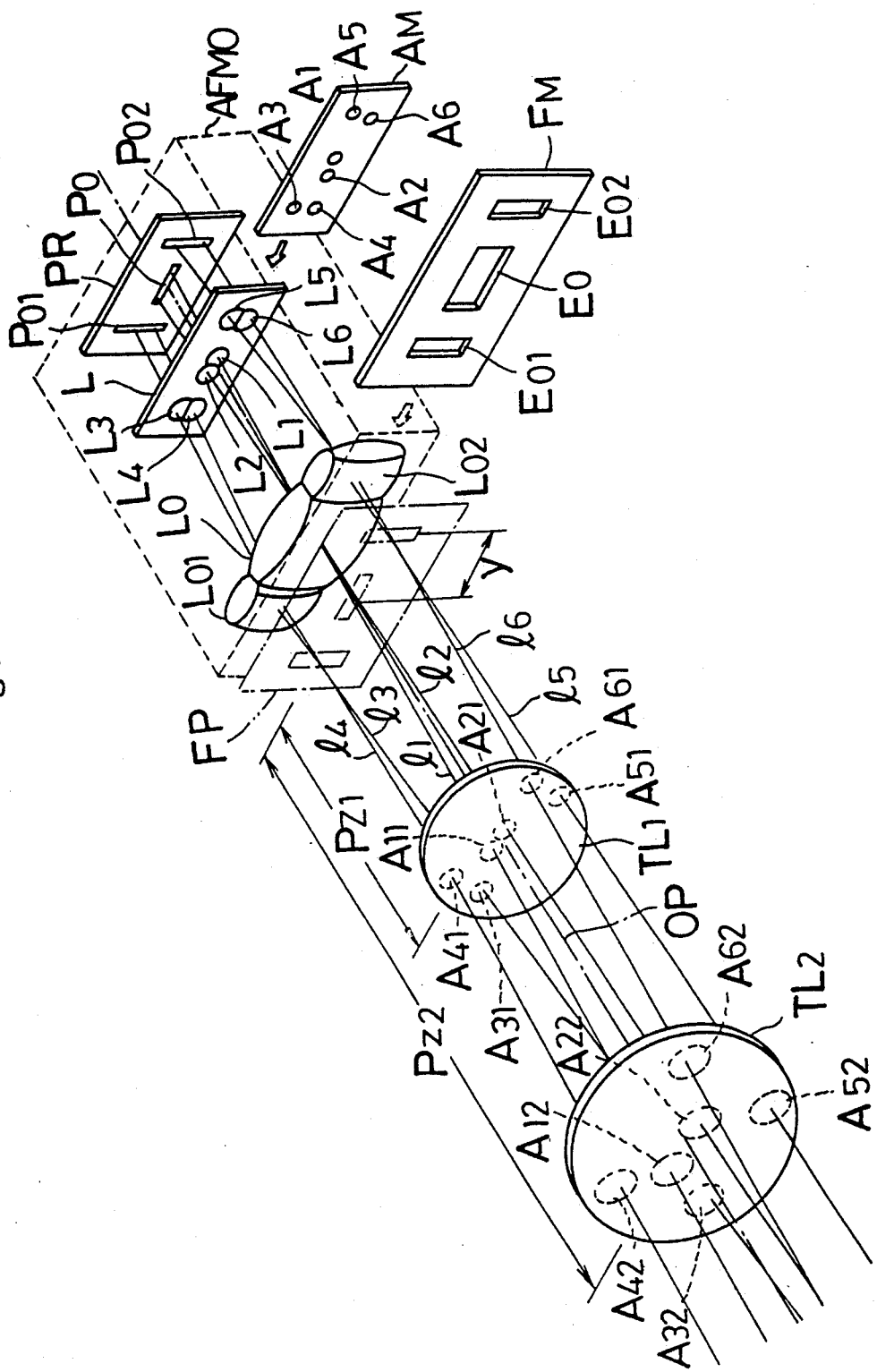
FIG. 2 is a schematic view of a focus condition detector of the camera.

FIG. 2 illustrates a schematic arrangement of a focus condition detector of the camera, in which two lenses TL1 and TL2 constitute the lens unit 2. The two lenses TL1 and TL2 are spaced by PZ1 and PZ2 (PZ1<PZ2) respectively from an equivalent to a film plane FP, that is an image forming plane on which the image is finally projected. Both the distances PZ1 and PZ2 will be referred to as exit pupil distances hereinafter. A view field mask FM is provided adjacent to the image forming plane FP. The view field mask FM has at center a first rectangular aperture EO extending lengthwise and at both ends two, second and third, rectangular apertures EO1, EO2 respectively.

A first condensor lens LO, a second condensor lens LO1, and a third condensor lens LO2 are arranged correspondingly to their respective apertures EO, EO1, and EO2 so that the flux of light from the object through the view field mask FM is converged. Also, an aperture mask AM and an image reproducing lens plate L are arranged to the rear of the condenser lenses LO, LO1, and LO2.

The image reproducing lens plate L carries at center two horizontally aligned lenses L1, L2 and at both ends, two pairs of vertically aligned lenses L3, L4 and L5, L6 respectively. Each of the image reproducing lenses L1 to L6 is a convex lens having the same curvature radius. They will be designated as the first image reproducing lens pair (L1, L2), the second image reproducing lens pair (L3, L4), and the third image reproducing lens pair (L5, L6) corresponding to the first EO, the second EO1, and the third aperture EO2 respectively. The aperture mask AM is directly disposed on the front flat surface of the image reproducing lens plate L and has three, first, second, and third, pairs of diaphragm apertures (A1, A2), (A3, A4) and (A5, A6) therein corresponding to their respective image reproducing lenses (L1, L2), (L3, L4) and (L5, L6).

Also, a photo sensor PR is provided at the rear of the image reproducing lens plate L, which includes three CCD line sensors PO, PO1, PO2 and mounted on a board. The horizontally extending CCD line sensor PO is mounted to the center of the board and the other vertically extending CCD line sensors PO1 and PO2 are mounted to both the side ends of the board so that the three sensors can match the first, second, and third image reproducing lens pairs of the image reproducing lens. Each of the CCD line sensors PO, PO1, and PO2 contains two, first and second, photoelectric elements for converting two optical images developed thereon by the image reproducing lens pair into electric outputs respectively. The three CCD line sensors PO, PO1, and PO2 will be referred to as a first, a second, and a third CCD line sensor corresponding to their respective apertures EO, EO1, and EO2 of the view field mask FM.

A block AFMO defined by the dotted line in FIG. 2 represents the AF sensor module 14 containing a focus condition detecting optical system consisting mainly of the view field mask FM, the aperture mask AM, and image reproducing lens plate L.

The process of detecting a focus condition from the image developed by the focus condition detecting optical system in the foregoing focus condition detector will now be explained. The beam of light from an object which is present off the optical axis OP of the lens unit 2 is incident at an angle to the optical axis OP to the view field mask FM for measurement of the object distance. A part of the light containing main rays 13 and 14 then passes across the second rectangular aperture EO1 to the second condenser lens LO1 where it is deflected towards the optical axis OP for convergence and transmitted through the second diaphragm apertures A3 and A4 of the aperture mask AM to the second image reproducing lens pair (L3, L4) of the image reproducing lens plate L. The partial light incident on the image reproducing lens plate L is converged by the second image reproducing lens pair (L3, L4) onto the second CCD line sensor PO1 and as the result, a pair of upper and lower images are produced on the second CCD line sensor PO1.

Another part of the light containing main rays 15 and 16 is transmitted through the third rectangular aperture EO2, the third condenser lens LO2, and the third diaphragm apertures A5 and A6 to the third image reproducing lens pair (L5, L6) and converged onto the third CCD line sensor PO2 for producing a pair of upper and lower images.

Also, the beam of light from an object which is present across the optical axis OP of the lens unit 2 contains main rays 11 and 12 and is transmitted through the first rectangular aperture EO, the first condenser lens LO, and the first diaphragm apertures A1 and A2 to the first image reproducing lens pair (L1, L2) and converged onto the first CCD line sensor PO for producing a pair of left and right images. Accordingly, the focal point of the lens unit 2 for the object is detected by calculating the position of the three images paired with images formed on the CCD line sensors PO, PO1, and PO2.

Figure 3:
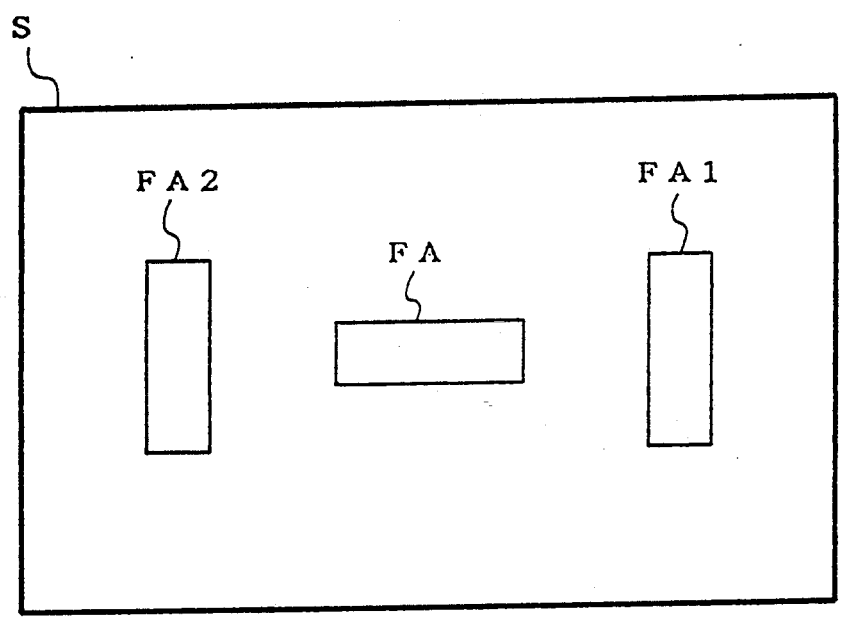
FIG. 3 is a view of a viewfinder screen of the camera.

FIG. 3 shows a display in a viewfinder of the camera. The display will be explained relative to the above focus condition detector.

An optical-axis focus condition detecting area FA is arranged corresponding to the first CCD line sensor PO. Similarly, two off-optical-axis focus condition detecting areas FA1 and FA2 are arranged corresponding to the second PO1 and the third CCD line sensor PO2, respectively. Accordingly, the focus condition for the object can be detected at the three areas in a shooting screen S. The three focus condition detecting areas FA, FA1, and FA2, will be termed as a first, a second, and a third island as each has to be identified.

Figure 4:
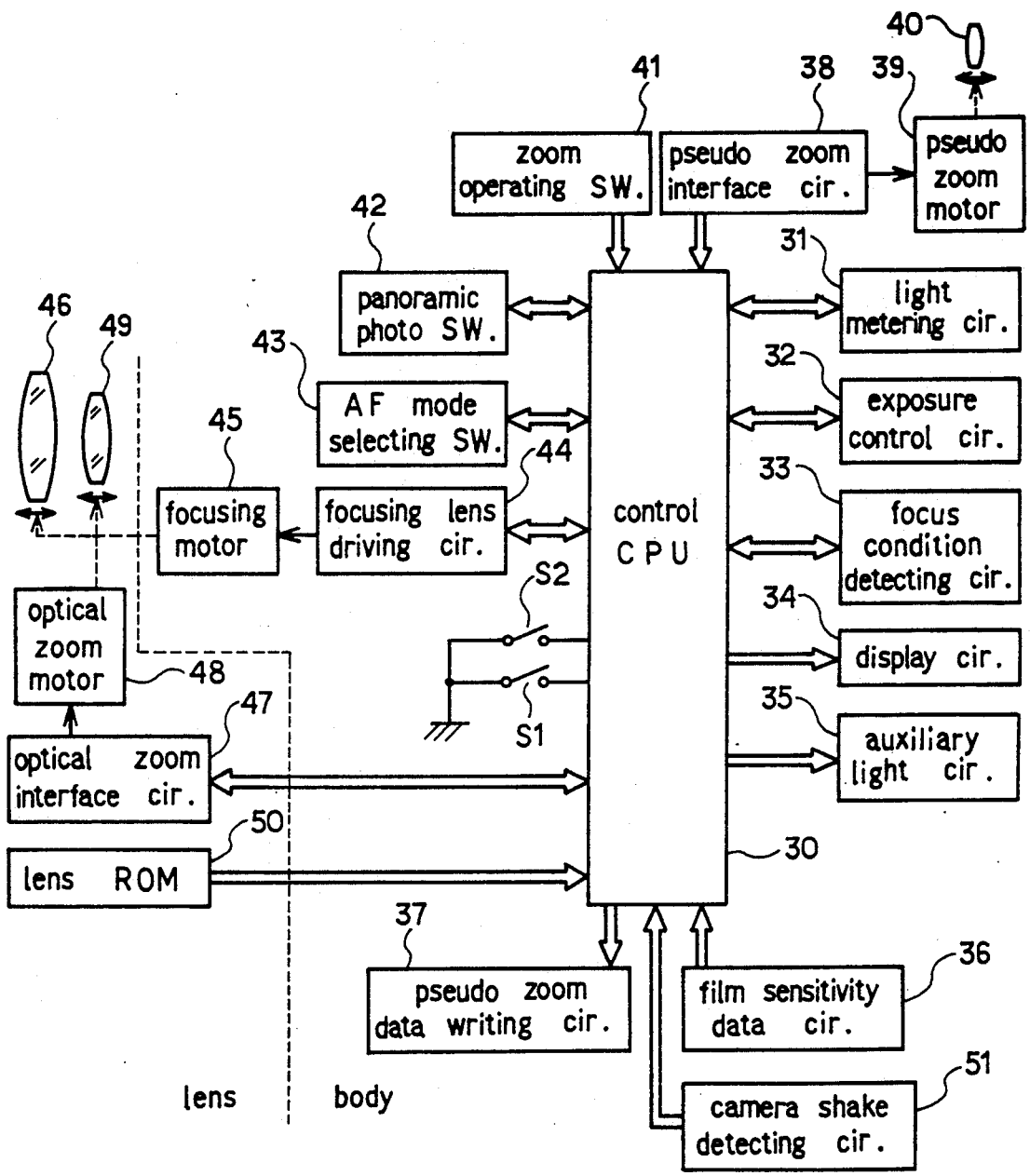
FIG. 4 is a block diagram showing a control system of the camera.

FIG. 4 is a block diagram of a control system of the camera, in which a master CPU 30 is provided for controlling the operation of other circuits. A light metering circuit 31 is provided for transmitting luminance data of the object to the master CPU 30 which in turn determines from the luminance data both a shutter speed (TV value) and an aperture size (AV value) for exposure control and at the start of an exposure control, feeds the TV and AV values to an exposure control circuit 32. The exposure control circuit 32 sends an instruction signal to an exposure control unit of the camera for producing an exposure according to the TV and AV values. The TV and AV values and the focusing condition are displayed by a display circuit 34 on the in-finder optical system 10 or an external readout on the body of the camera. A focus condition detecting circuit 33 contains the foregoing focus condition detector, determines a focus condition at each island for the object and delivers it to the master CPU 30. Also, an auxiliary light circuit 35 is provided for producing an auxiliary lighting to the object when the distant measurement with the focus condition detecting circuit 33 is not permitted due to low contrast or dim light.

The auxiliary light circuit 35 is built in the body of the camera according to the embodiment and may be installed in a flash or accessory unit. A film sensitivity data circuit 36 is also provided for feeding data of film sensitivity, e.g. ISO numbers, to the master CPU 30.

There is provided a pseudo-zooming data writing circuit 37 for recording on a film surface pseudo focal length data of the photograph. The technique of data recording is selected from various known methods including magnetic recording. The pseudo focal length data is used for determining a trimming size during printing a picture to a photographing paper. A pseudo-zooming interface circuit 38 is provided for, upon receipt of a command from the master CPU 30, actuating a pseudo-zooming motor 39 which then moves an in-finder relay lens 40 for varying the in-finder magnification. The pseudo-zooming magnification is transmitted through the pseudo-zooming interface circuit 38 to the master CPU 30. A zoom operating switch 41 is mounted on the camera body for varying the pseudo focal length (feq) by an operator for telescopic or wide-angle effects.

The pseudo focal length (feq) is expressed as:

$$(feq) = (foz) + (fez)$$

where (foz) is an optical zooming focal length and (fez) is a pseudo-zooming magnification. Hence, a printed photo becomes equal in magnification to that taken with a lens having the focal length (feq). In practice, a desired amount of the focal length (feq) can be obtained by actuating the pseudo-zooming interface circuit 38, an optical zooming interface circuit 47 described later, or both with a command from the master CPU 30. Also, the zoom operating switch 41 may be mounted to the detachable lens unit.

Figure 5A:
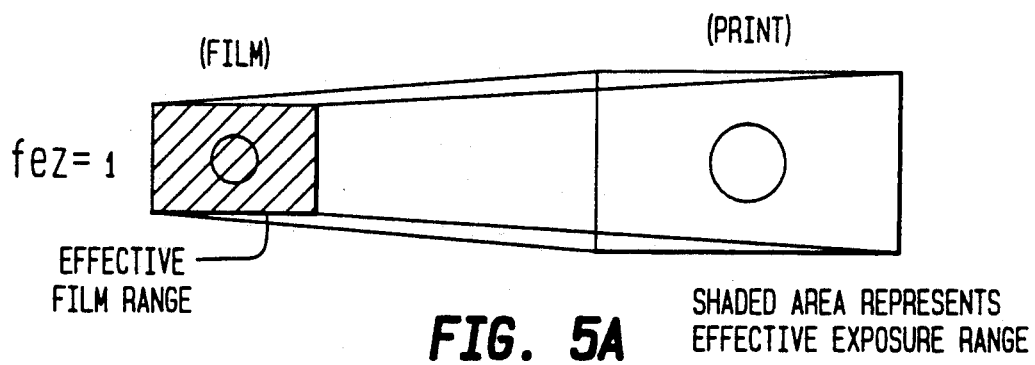
FIGS. 5-a, 5-b, and 5-c illustrates the relation between and print, in which FIG. 5-a is at fez=1, FIG. 5-b is at fez=2, and FIG. 5-c is at a panoramic mode setting.
Figure 5B:
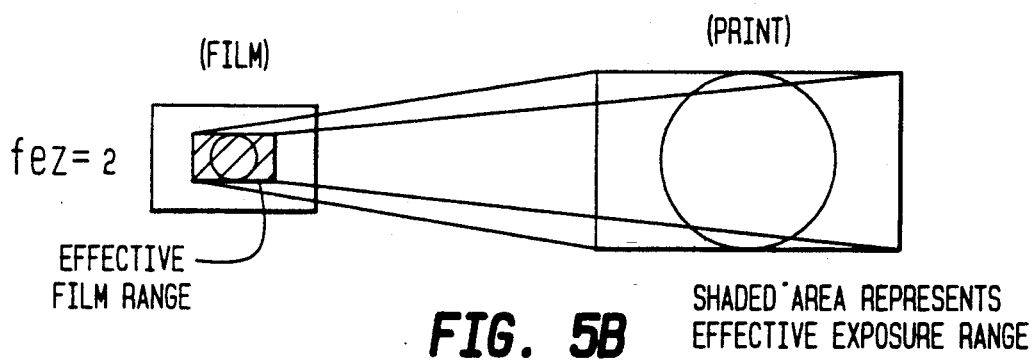
Figure 5C:
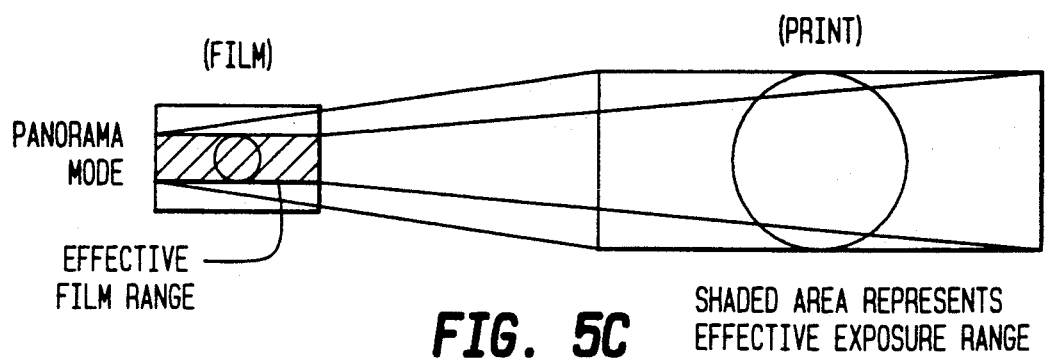

A panoramic photo switch 42 is mounted on the camera body for shooting a panoramic picture which is increased in width. When the panoramic photo switch 42 is pressed on, the panoramic shooting shield 20 moves to the front of the visual field frame 9 and also, a panorama mode selection signal is sent to the master CPU 30. FIG. 5 shows the relation between a film and its print, in which FIG. 5-a is at fez=1, FIG. 5-b is at fez=2, and FIG. 5-c is in the panorama mode. As shown, the shaded area represents an effective exposure range.

Back to FIG. 4, an AF mode selecting switch 43 is provided for selecting from a one-shot mode in which the AF operation is canceled upon correct focusing, a continuous mode in which the AF operation is carried out in response to each output of the focus condition detecting circuit 33, and an automatic mode in which the mode is automatically selected between one-shot and continuous through detecting the object movement. A focusing lens driving circuit 44, upon receiving a signal from the master CPU 30, starts activating a focusing motor 45. The focusing motor 45 then actuates a coupler, not shown, to move a focusing lens 46 for focusing.

The optical zooming interface circuit 47 is arranged for activating an optical zoom motor 48 upon receipt of a command from the master CPU 30. The optical zoom motor 48 then actuates a variable focal length lens 49 of the lens unit 2 to vary the optical zooming focal length (foz). Also, the optical zooming interface circuit 47 delivers focal length data to the master CPU 30. A lens ROM 50 is provided for storage of inherent characteristics of the lens unit 2 including f-stop numbers for aperture opening, a range of focusing, and lens movement per coupler full rotation. Those data are transferred, when needed, from the lens ROM 50 to the master CPU 30.

A switch S1 is closed when a release button (not shown) is pressed to a half position and thus, the camera starts operating both a light metering and an AF operation. A switch S2 for exposure control is closed when the release button is fully pressed down. A camera-shake detecting circuit 51 is also provided for detecting an abrupt movement of the camera during focusing with e.g. an angular velocity sensor and transmitting its data to the master CPU 30.

Figure 6:
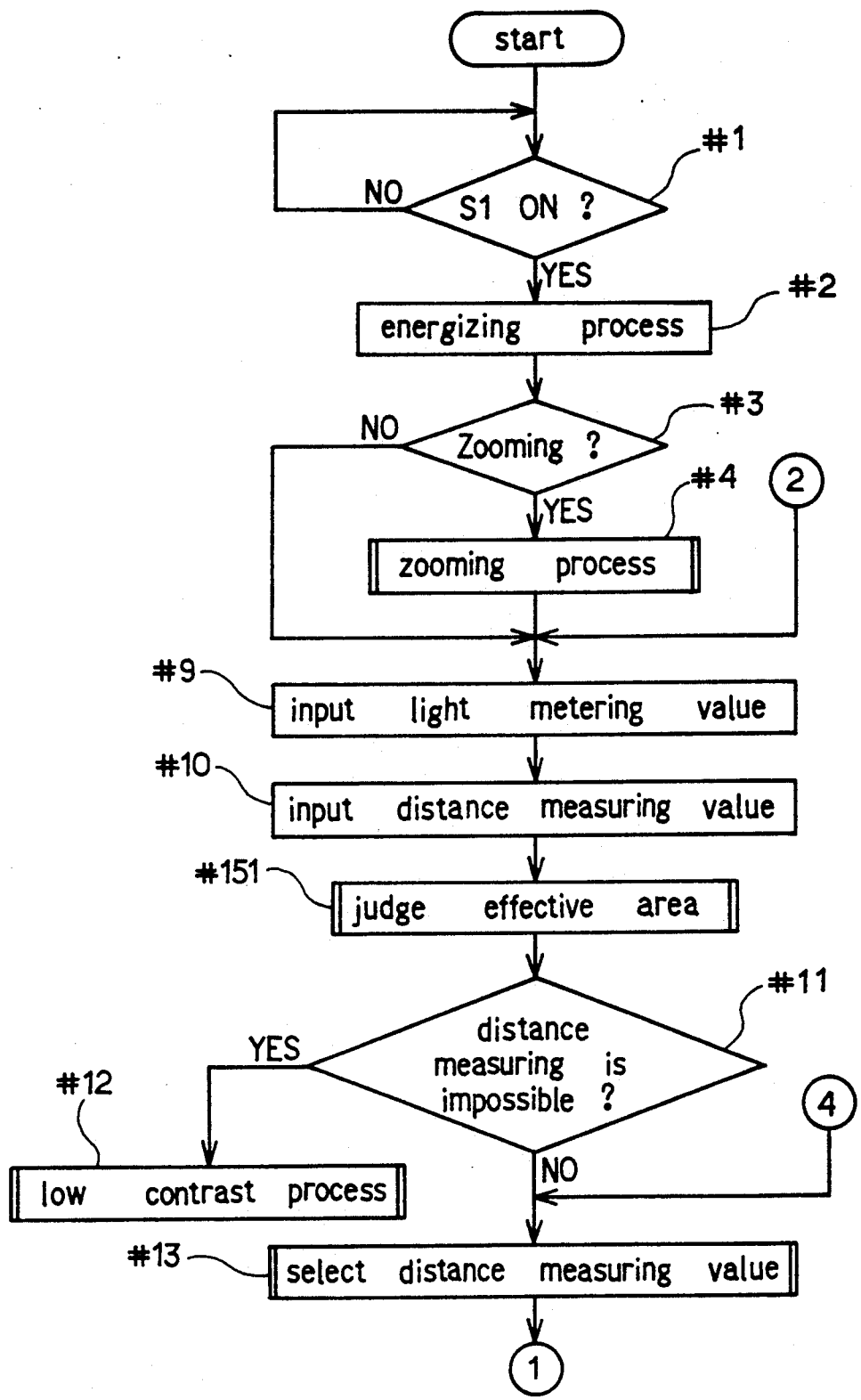
FIGS. 6-a and 6-b are flow charts showing an operation of the master CPU illustrated in FIG. 4.
Figure 6:
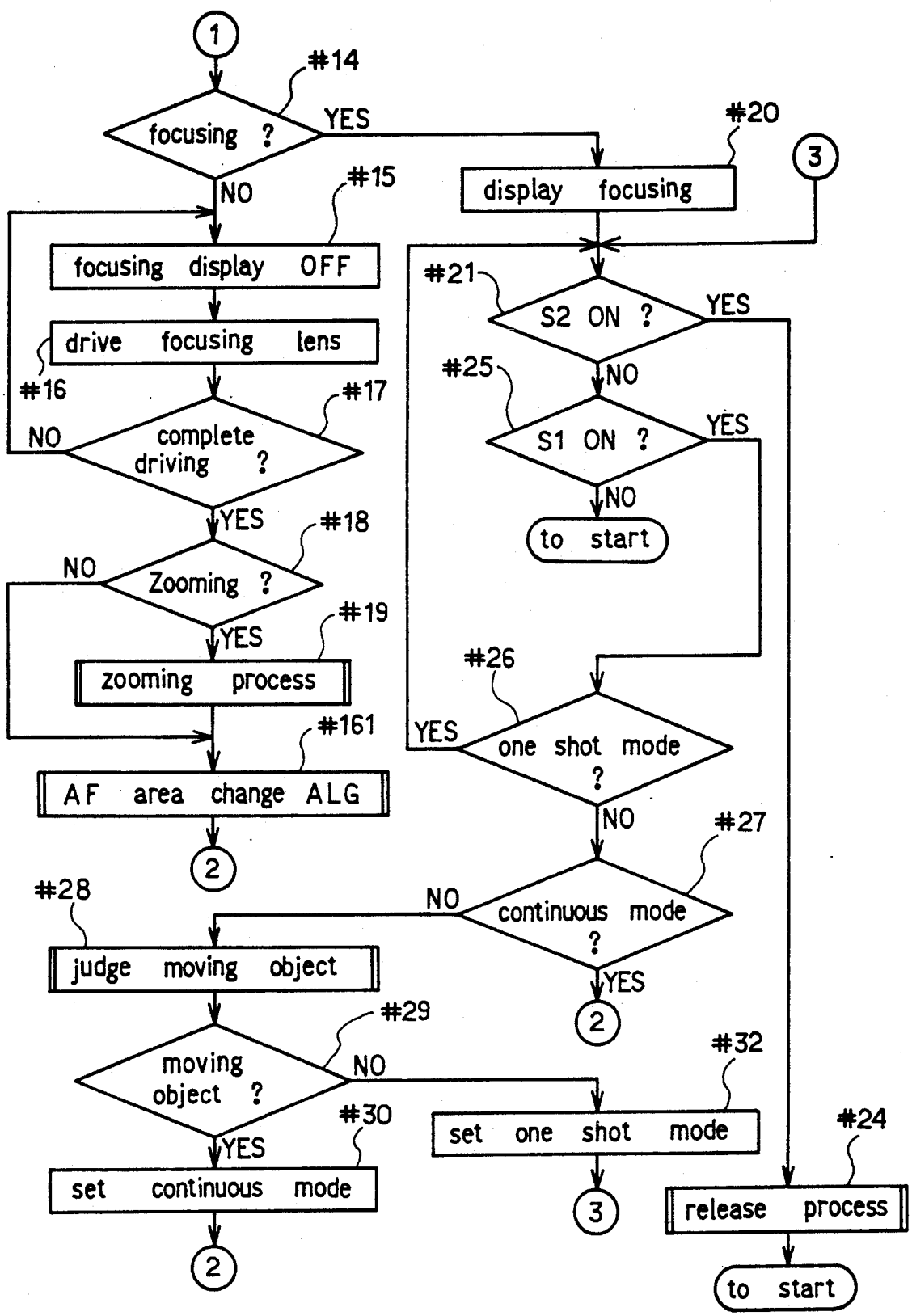

FIGS. 6-a and 6-b are flow charts showing an operation of the master CPU 30. The procedure starts with the switch S1 being activated on upon half depression of the release button (Step 1). When the switch S1 is turned on, all the circuits are energized (Step 2). At the time, the relevant lens data is received from the lens ROM 50 and the initial setting for lens positioning is carried out. The initial setting for lens positioning includes actuating a range ring to the infinite focusing position and resetting a counter for calculation of the lens movement.

Then, it is examined whether the zoom operating switch 41 is ON or not (Step 3). If yes, the zooming process is executed (Step 4). The light metering value is input (Step 9) and the distance measuring value is input (Step 10). At Step 151, the effective area is examined, which will be described in more detail later. The reliability of the distance measuring value is then examined (Step 11). If the distance measuring value is not reliable, a low contrast process is introduced for compensation of such error distance measurement (Step 12). If the distance measuring value is reliable, a measurement involving the target data is selected from the measuring value at the three distance measuring areas (Step 13).

It is examined from the distance measuring value whether the focusing is correct or not (Step 14). If not, the display of focusing sign is turned off (Step 15) and the focusing lens 46 is driven for refocusing (Step 16). The driving of the focusing lens 46 is calculated from the distance measuring value. After the driving of the focusing lens 46 is completed (yes at Step 17), it is re-examined whether the zooming is demanded or not (Step 18). If yes, the zooming is executed (Step 19). In succession, the AF area change algorithm is computed for varying the measuring area without change of the pseudo focal length (feq) (Step 161). The procedure is then returned to Step 9. This procedure will be repeated until the correct focusing is established.

If it is determined at Step 14 that the correct focusing is given, the focusing sign is displayed (Step 20). After displaying, the switch S2, which is ON at full depression of the release button, is examined (Step 21). If the switch S2 is ON, the release is carried out (Step 24) and the procedure returns to the start step.

If the switch S2 is not ON at Step 21, the switch S1 is examined to determine whether it is ON or not (Step 25). If not, it is determined that the shooting action is canceled and the procedure goes back to Step 1 where the switch S1 remains at standby. If the switch S1 is ON at Step 25, it is then examined whether the one-shot mode is selected or not (Step 26). If yes, the procedure moves back to Step 21 where the state of the switch S2 is examined again. In the one-shot mode, the AF control is locked after the correct focusing is established and the switches S1 and S2 remain at standby for OFF and ON actions, respectively, while no focusing control is attempted.

If it is determined at Step 26 that the one-shot mode is not selected, the continuous mode is examined to determine whether it is selected or not (Step 27). If yes, the procedure moves to Step 9 and the succeeding measurement of object distance and its corresponding focusing control are executed. More specifically, the same action of the following steps is carried out and the focusing control is repeated after the correct focusing is given. If the continuous mode is not selected, the auto mode for AF control is involved and the procedure goes to Step 28 for moving object examining.

If it is determined at Step 29 that the object to be shot is a moving object, the continuous mode is set (Step 30) and the procedure returns to Step 9 for repeating the focus condition detection. If no at Step 29, the one-shot mode is again set (Step 32) and the procedure moves back to Step 21 from which a subroutine of examining the switches S2 and S1 is executed. As described, the auto mode examines whether the object to be shot is a moving object or not and automatically shifts to the continuous mode if yes and to the one-shot mode if no.

Figure 7:
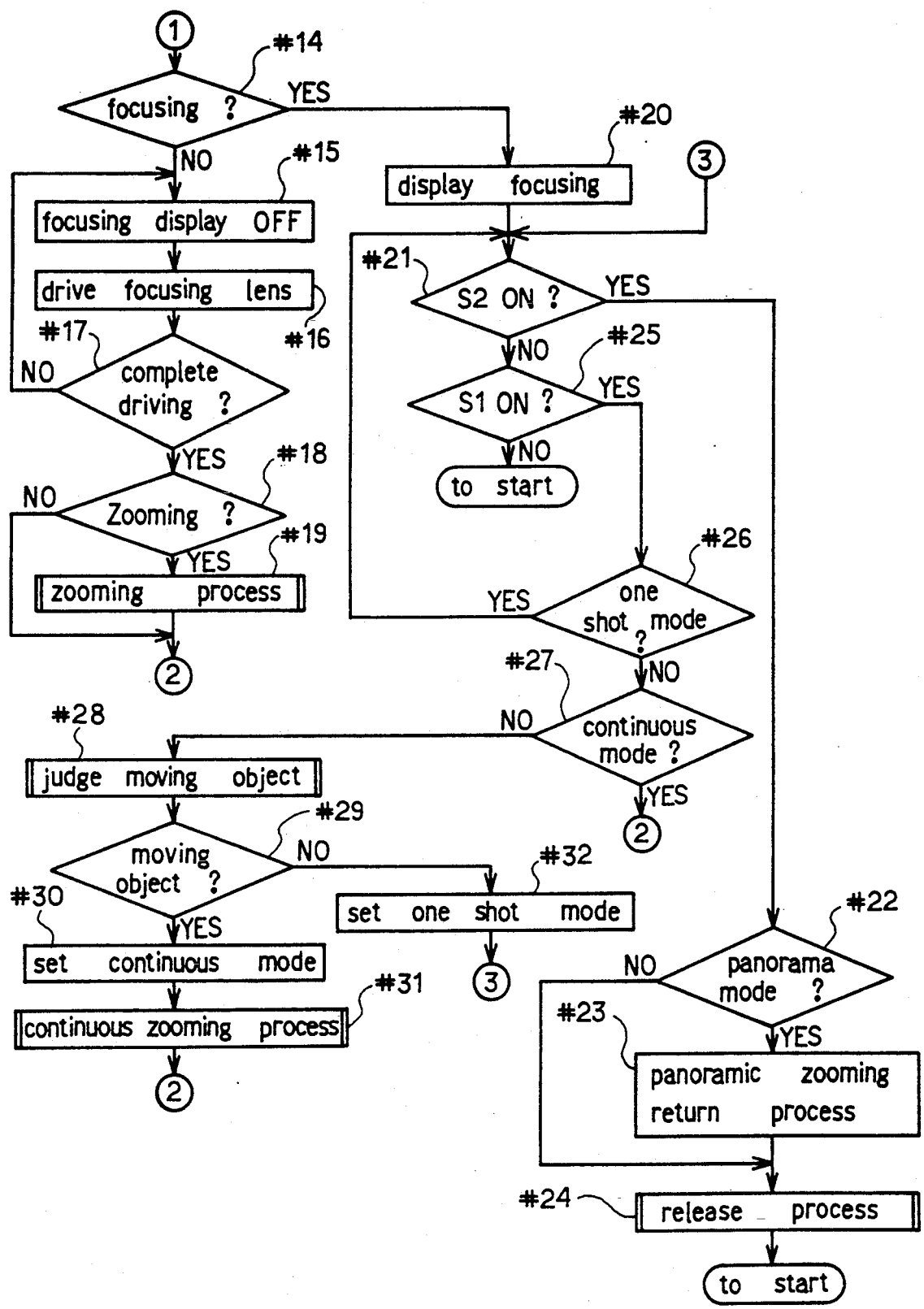
FIGS. 7-a and 7-b are flow charts showing another operation of the master CPU.

FIGS. 7-a and 7-b illustrate another operation of the master CPU 30. The operations which are different from the previous operation shown in FIGS. 6-a and 6-b will be described. After the zooming process at Step 4, the panorama mode is examined to determine whether it is selected or not (Step 5). If yes, the panoramic zooming is performed (Step 6). Then, the continuous mode is examined to determine whether it is selected or not (Step 7). If yes, the continuous zooming is executed (Step 8) and the procedure moves to Step 9.

Also, the state of the switch S2 is examined at Step 21 which is to be turned ON by full depression of the release button. If the switch S2 is ON, the panorama mode is examined to determine whether it is demanded or not (Step 22). If yes, a panoramic zoom returning process is executed (Step 23) and the release is carried out (Step 24) before returning to the start step.

If it is determined at Step 29 that the object is a moving object, the continuous mode is set (Step 30) and the continuous zooming is executed (Step 31). Then, the procedure goes back to Step 9 and the focus condition detection is repeated.

Figure 8:
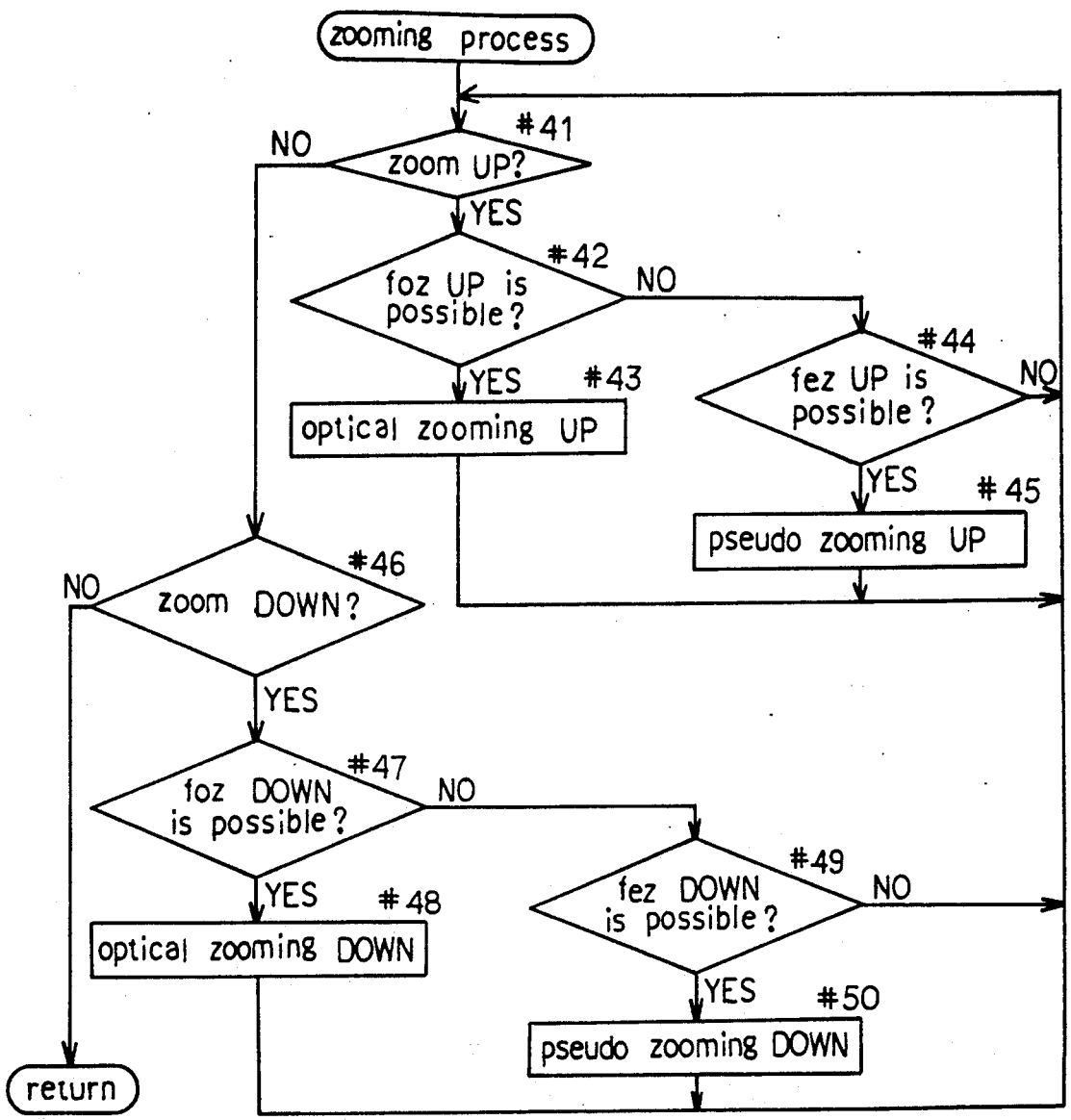
FIG. 8 is a flow chart showing a zooming process.

The zooming operation will now be explained in more detail referring to FIG. 8.

At Step 41, it is determined whether a zoom-up operation is demanded or not. If yes, it is determined whether an optical zoom-up operation can be made by varying the optical zooming focal length (foz) or not (Step 42). If yes, the optical zoom-up operation is executed (Step 43) and the procedure moves back to Step 41. If not at Step 42 (when the optical zooming focal length (foz) is maximum), it is determined whether the zoom-up operation can be made by varying the pseudo-zooming magnification (fez) or not (Step 44). If yes, the pseudo zoom-up operation is carried out (Step 45) and the procedure goes to Step 41. If not, the procedure directly returns to Step 41.

If the zoom-up operation is not demanded at Step 41, it is determined whether a zoom-down operation is demanded or not (Step 46). If yes, it is determined whether an optical zoom-down operation can be made or not by varying the focal length (foz) (Step 47). If yes, the optical zoom-down operation is executed (Step 48) and the procedure moves back to Step 41. If not at Step 47 (when the optical zooming focal length (foz) is minimum), it is determined whether the zoom-down operation can be made by varying the pseudo-zooming magnification (fez) or not (Step 49). If yes, the pseudo zoom-down operation is carried out (Step 50) and the procedure goes to Step 41. If not, the procedure instantly returns to Step 41. The priority is given to the optical zooming operation because the ratio of the distance measuring areas to the entire effective exposure control area is preferably maintained unchanged.

Figure 9:
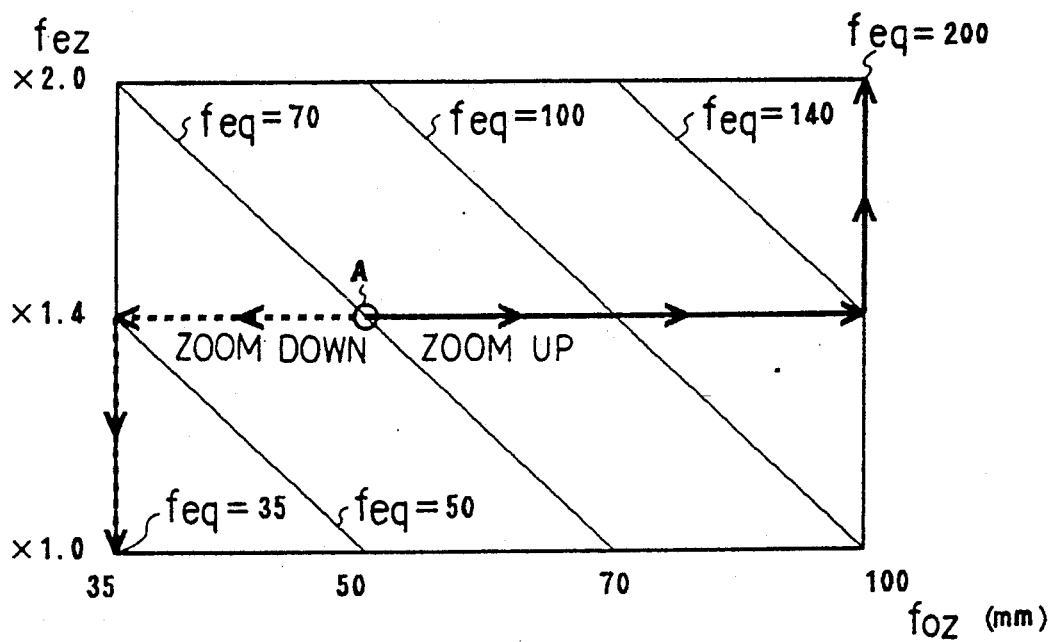
FIG. 9 is a diagram showing the relation between foz, fez, and feq in the zooming process.

An example of the foregoing procedure will be described referring to FIG. 9, in which the optical zooming focal length (foz) varies along the horizontal axis (from 35 to 100 mm) and the pseudo-zooming magnification (fez) varies along the vertical axis (from ×1 to ×2). The equivalent focal length (feq) is on an oblique line.

As shown, a zoom-up operation from the point A (where foz=50 mm, fez=×1.4, and feq=70 mm) is denoted by the solid line and a zoom-down operation is denoted by the dotted line, by which manner the optical zooming focal length (foz) and the pseudo-zooming magnification (fez) are determined.

The effective area judgement will be explained referring to FIGS. 10 and 11.

Figure 10A:
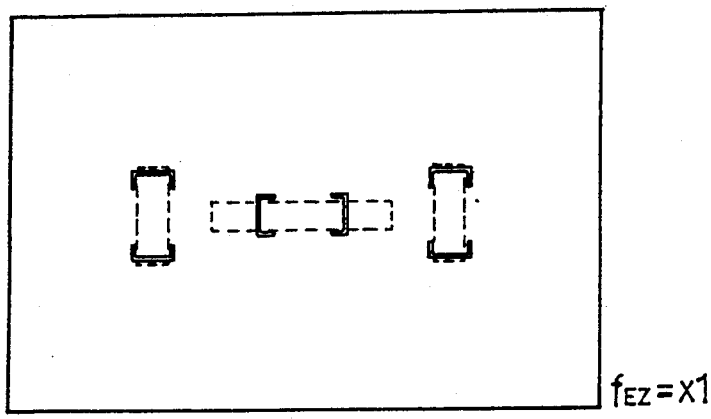
FIGS. 10-a, 10-b, and 10-c is a view showing the relation between the effective exposure control area and the distance measuring areas in the camera.
Figure 10B:
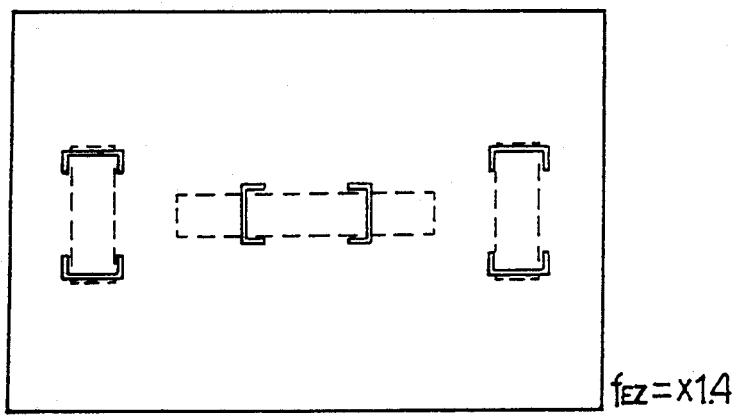
Figure 10C:
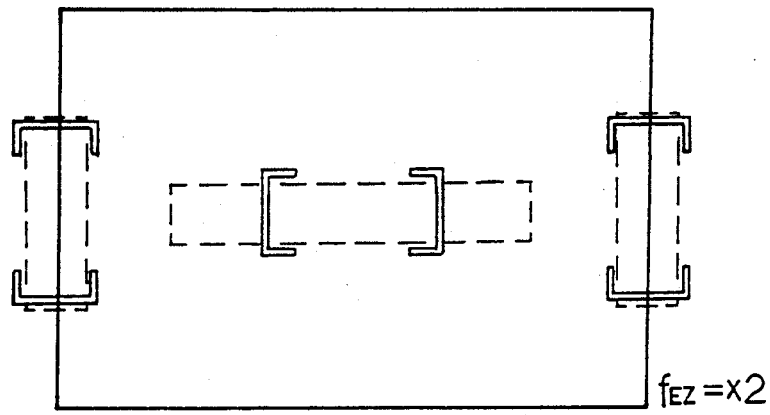
Figure 11:
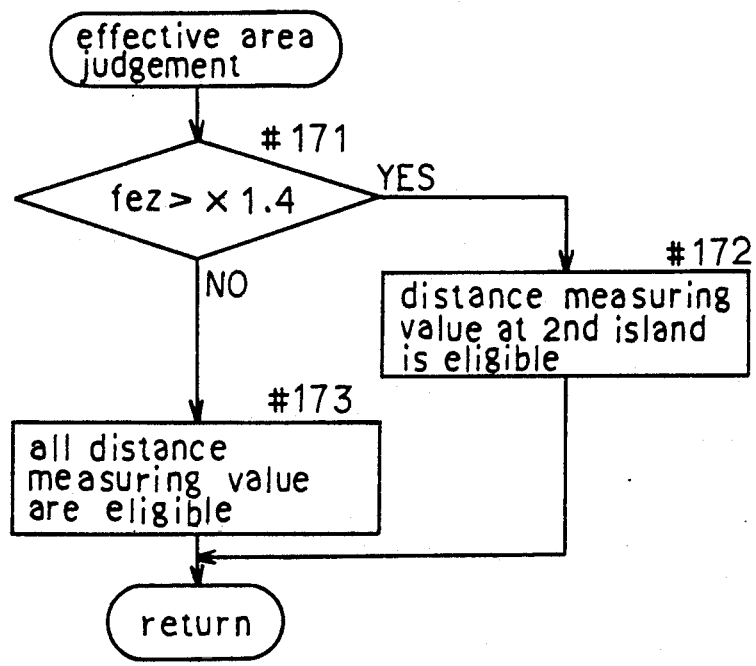
FIG. 11 is a flow chart showing an effective area detecting process in the camera.

FIG. 10-a shows the relation between the effective exposure control area and the distance measuring areas when fez=×1. As apparent, if the pseudo-zooming magnification (fez) is increased to ×2, the distance measuring areas move out from the effective exposure control area as shown in FIG. 10-c. In that case, it is desired that the two distance measuring areas at side ends not be used as they measure objects outside the viewfinder. Also, the two side end areas appear at edge regions of the effective exposure control area when the pseudo-zooming magnification (fez) is as high as ×1.4, as shown in FIG. 10-b. However, it is less likely that the main object will be viewed in these regions and thus, the two distance measuring areas may not be used.

The effective area judgment will now be explained referring to the flow chart of FIG. 11. It is first judged whether the pseudo-zooming magnification (fez) is more than ×1.4 or not (Step 171). If yes, the distance measuring area (second island) at the center is determined eligible (Step 172). If the pseudo-zooming magnification (fez) is not more than ×1.4, the procedure moves to Step 173 in which measurement at all the three distance measuring areas are determined eligible and then, to the return step.

It is noted that if the three distance measuring areas remain inside and not out of the effective exposure control area at over ×2 of the pseudo-zooming magnification (fez), the foregoing procedure is not needed. The following description will hence be made assuming that the distance measuring areas stay inside the effective exposure control area at fez=×2.

Figure 12:
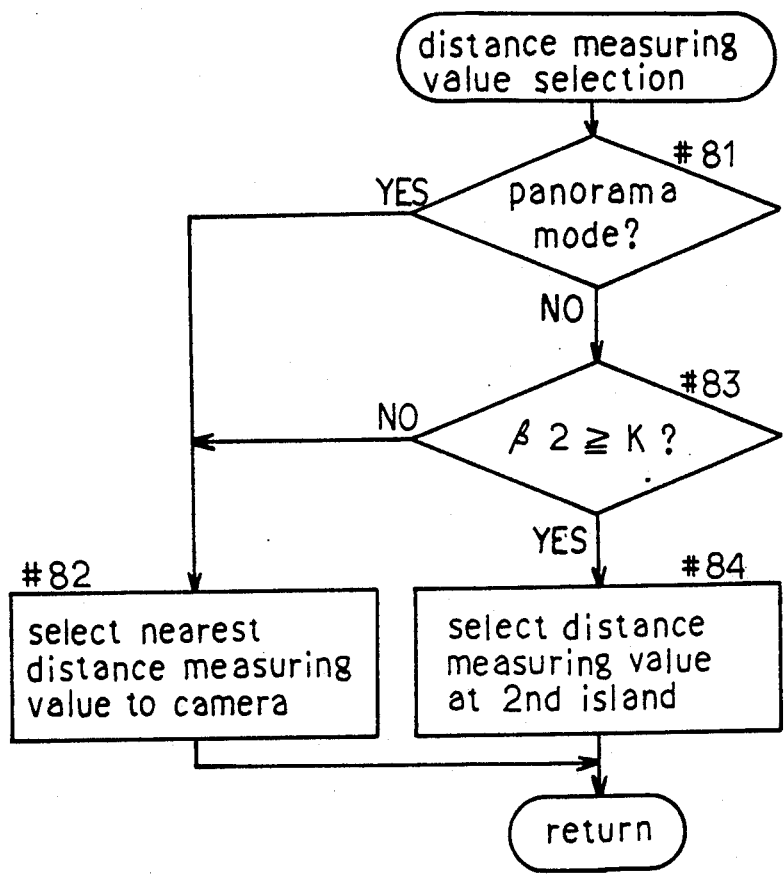
FIG. 12 is a flow chart showing a distance measuring value selecting process.

The selection of a distance measuring value will be explained referring to FIG. 12. First, it is judged whether the panorama mode is selected or not (Step 81). If yes, the nearest value to the camera is chosen from the three different distance measurements (Step 82) and the procedure moves to the return step. If no at Step 81, the object magnification β2 at the second island is judged to determine whether it is more than a given value K or not (Step 83). If not more than K, the procedure goes to Step 82. If more than K, the measurement at the second island is selected (Step 84) before moving to the return.

The foregoing process, for selecting the nearest value to the camera from the three different values measured at their respective distance measuring areas, is preferred because the panorama mode produces an image in which objects are seen not only at the center but also at both side ends. In normal mode shooting, the same operation will desirably be conducted when the object magnification β is small enough to be regarded as e.g. a scenery photo. If the object magnification β is great as in a portrait, the main object appears at center and a center area value out of the three measurements will be selected. It is now understood that the center area value corresponding to a main object viewed at a center region of the photo is constantly selected even if the two side end distance measuring areas detect a distance to a nearer object than the main object.

Figure 13:
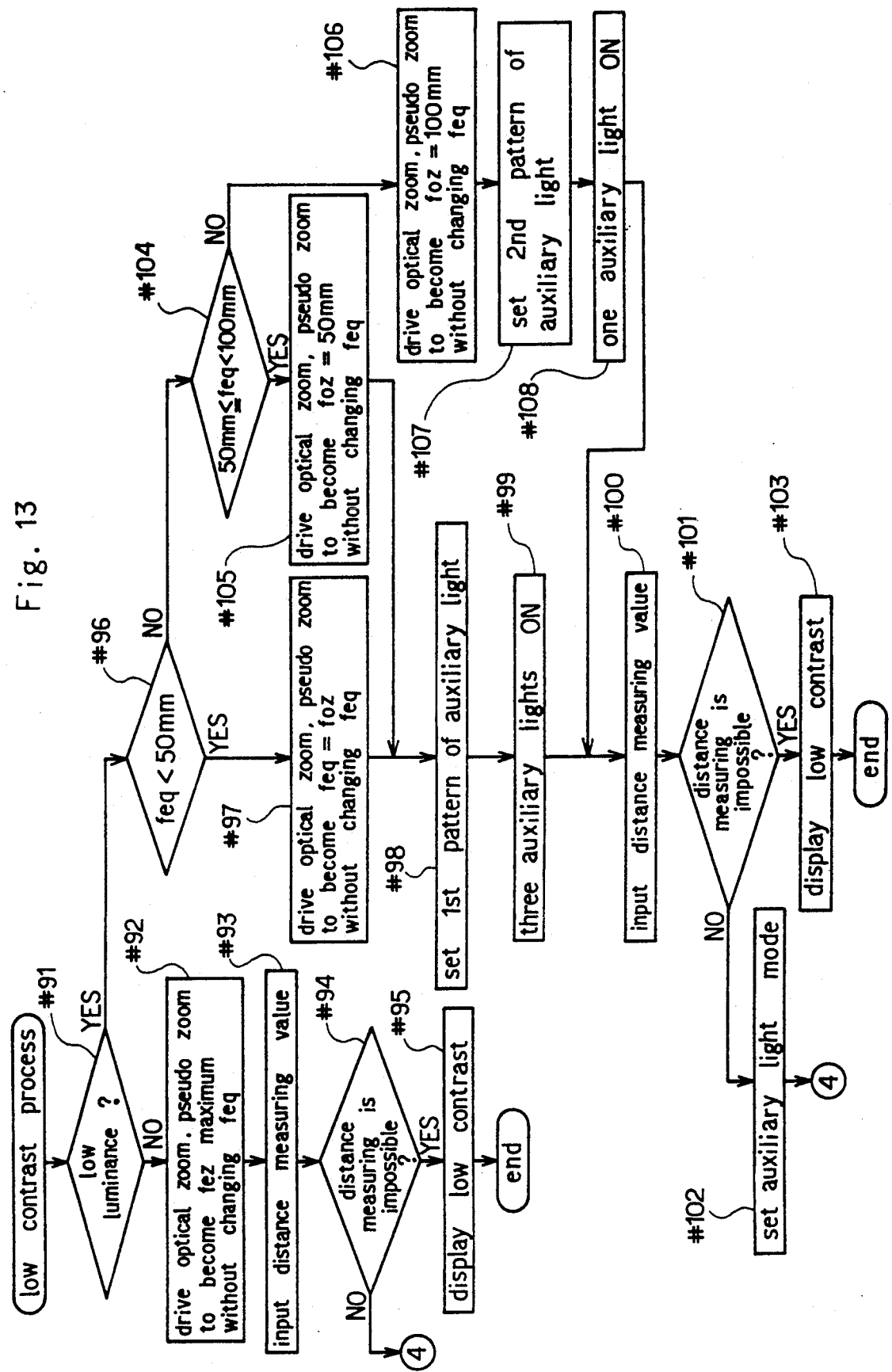
FIG. 13 is a flow chart showing a low contrast process.
Figure 14:
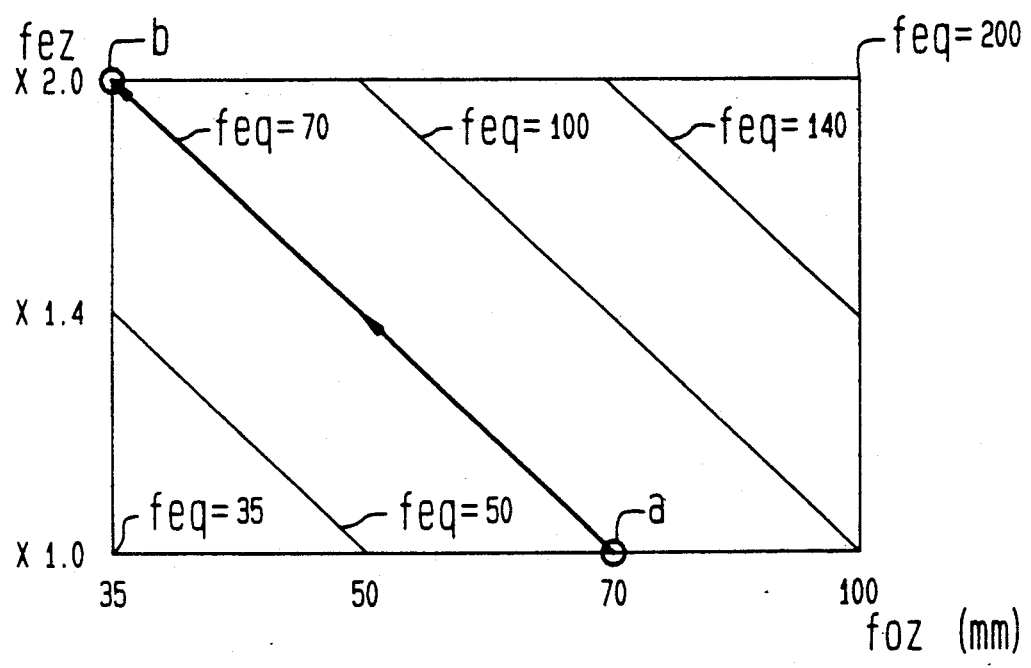
FIG. 14 is a diagram showing the relation between foz, fez, and feq in the low contrast process.

The low contrast process which is executed when the distance measuring values are not reliable (due to low contrast or dim lighting), will now be described referring to FIG. 13. The procedure starts with examining the luminance on the object (Step 91). High luminance indicates that the distance measuring areas contain no effective contrast objects. If the distance measuring areas are increased in size, effective contrast objects may be involved in the distance measuring areas, thus enabling the measuring process. For increasing the distance measuring areas, the pseudo zooming or optical zooming process is conducted (Step 92) so that the pseudo-zooming magnification (fez) becomes maximum, e.g. from the point a to the point b shown in FIG. 14, while the equivalent focal length (feq) remains unchanged. Then, the distance measuring value is input (Step 93) and it is judged whether the distance measurement is enabled or not (Step 94). If yes, the procedure moves to Step 13 while the distance measuring areas stay unchanged. If not, the low contrast process is carried out (Step 95) before finishing the procedure.

When it is determined at Step 91 that the luminance is low, the main object exhibits less effective contrast due to low lighting and a supplementary or auxiliary lighting is needed.

Figure 15:
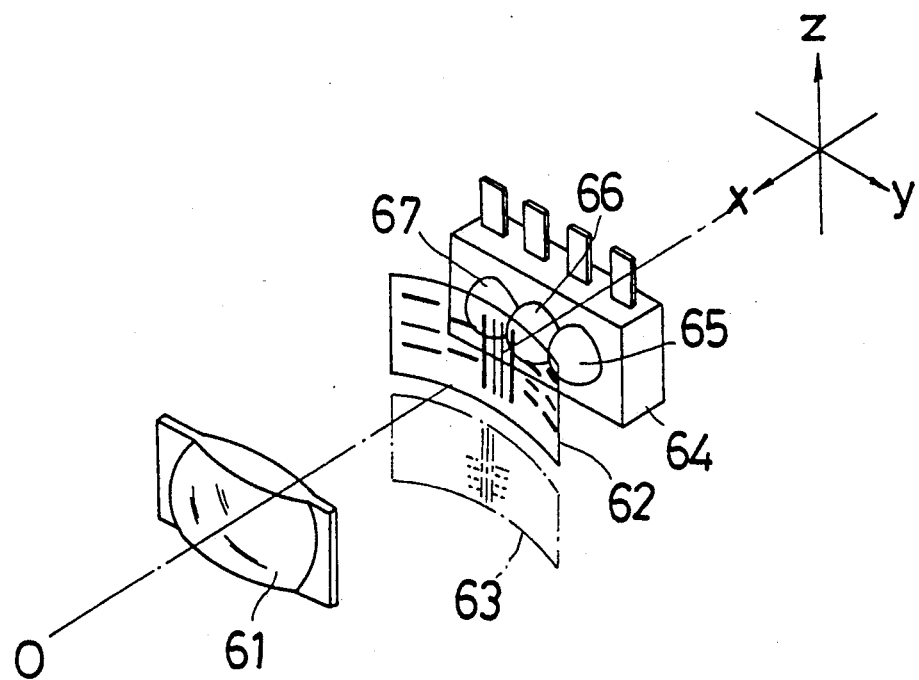
FIG. 15 is a view of a distance measuring device of the camera.

The operation of auxiliary lighting will be described referring to FIGS. 15, 16, and 17. FIG. 15 shows the arrangement of an auxiliary light unit of the camera, in which there are provided a projector lens 61, a first projection pattern 62, a second projection pattern 63, and a light emitting diode (LED) 64. The LED 64 comprises three light emitting chips which can illuminate separately and three condenser lenses 65, 66, and 67 for intensifying light from their respective light emitting chips.

Each of the first and second projection patterns 62, 63 consists of a light transmission section and an opaque section and arranged for projecting a pattern of light onto the object for developing a higher contrast. The second projection pattern 63 is smaller than the first projection pattern 62 and they are selectively replaced with each other corresponding to the optical zooming focal length (foz) during auxiliary lighting operation.

Figure 16:
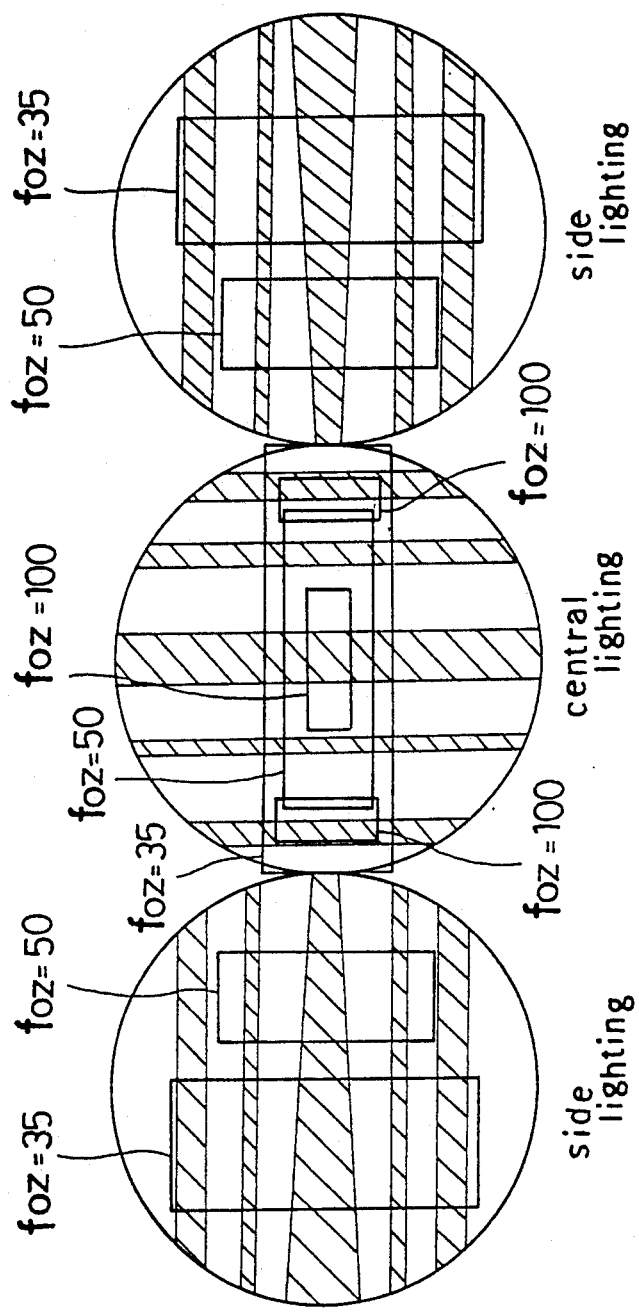
FIG. 16 is a view showing the projected pattern form of a first pattern across the distance measuring areas.

FIG. 16 illustrates the relation between a projected stripe form through the first projection pattern 62 and the three distance measuring areas. As apparent, when the optical zooming focal length (foz) ranges from 35 mm to 50 mm, the three, center and two side end, distance measuring areas show effective contrast. However, if the optical zooming focal length (foz) is 100 mm, the two side end areas exhibit no contrast while the center area shows only one stripe contrast pattern and thus, the distance measurement will be declined in accuracy. Also, if a narrower stripe pattern is used for giving an effective contrast at 100 mm of the optical zooming focal length (foz), the distance measurement will be declined at the optical zooming focal length (foz) of 35 to 50 mm due to a high frequency caused by the narrower stripe pattern. Since the optical zooming focal length (foz) and the pseudo zooming magnification (fez) are available within ranges of 35 to 50 mm and ×1 to ×2 respectively, the first projection pattern 62 is preferably used with 35 to 100 mm of the equivalent focal length (feq).

Figure 17:
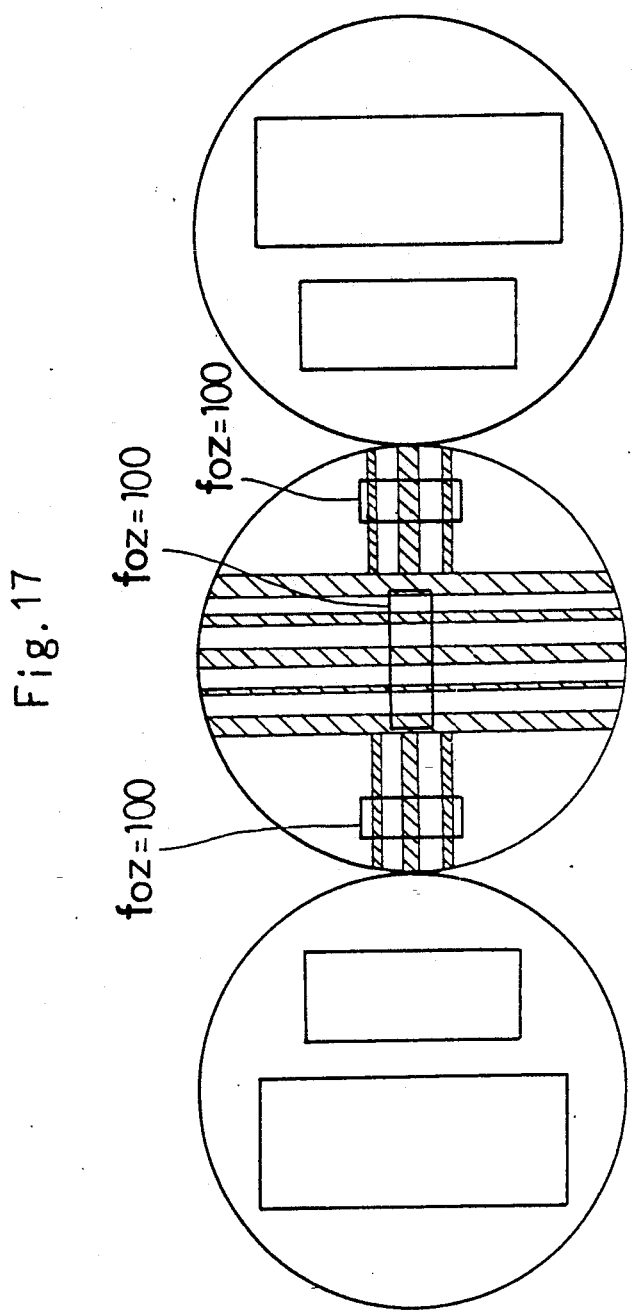
FIG. 17 is a view showing the projected pattern form of a second pattern across the distance measuring areas.

FIG. 17 illustrates the relation between a projected stripe form through the second projection pattern 63 and the three distance measuring areas. As apparent, when the optical zooming focal length (foz) is 100 mm, the three distance measuring areas all show effective contrast due to a narrow stripe pattern as compared with the first pattern 62.

However, lighting at both sides where no measuring area is present is of no use while a center lighting works. It is hence desired that the center lighting is only applied when the optical zooming focal length (foz) is 100 mm. The second projection pattern 63 is preferably used at 100 to 200 mm of the equivalent focal length (feq) since the pseudo zooming magnification (fez)

ranges ×1 to ×2 with 100 mm of the optical zooming focal length (foz).

The setting of a desired pattern determined by the equivalent focal length (feq), the optical zooming focal length (foz), and the pseudo-zooming magnification (fez) is shown below in respect to light-up areas.

| feq | 35 | 50 | 100 | 100 | 200 |
|---|---|---|---|---|---|
| foz | 35 | 50 | 50 | 100 | 100 |
| fez | ×1 | ×1 | ×2 | ×1 | ×2 |
| pattern | 1st | 1st | 1st | 2nd | 2nd |
| light-up area | all | all | all | center | center |

The procedure for execution of the foregoing auxiliary lighting will now be explained referring to FIG. 13. If it is determined at Step 91 that the luminance is low, the equivalent focal length (feq) is judged to determine whether it is less than 50 mm or not (Step 96). If yes, the pseudo zooming and the optical zooming is carried out until feq=foz is established without change in the equivalent focal length (feq) (Step 97). Then, the first projection pattern 62 is set in place for auxiliary lighting (Step 98). Simultaneously, all the three light emitting chips are turned ON as the optical zooming focal length (foz) is within a range of 35 to 50 mm (Step 99). The distance measuring value is input (Step 100) and it is judged whether the distance measurement is correct or not (Step 101). If yes, the auxiliary light mode is selected (Step 103) and the procedure moves to Step 11. The auxiliary light mode performs an auxiliary lighting upon input of the distance measuring value.

If no at Step 101, the low contrast display is turned ON (Step 102) and the procedure is ended. The pseudo zooming and the optical zooming are carried out until feq=foz is given at Step 97 although the optical zooming focal length (foz) is 35 mm to 50 mm. This is done because the frequency of the first pattern 62 and the frequency characteristic of distance measurement calculation are designed to become optimum when foz=50 mm and thus, for approximating the optical zooming focal length (foz) to 50 mm.

If the equivalent focal length (feq) is found not less than 50 mm at Step 96, it is then judged whether smaller than 100 mm or not (Step 104). If yes, the pseudo zooming and the optical zooming is carried out until foz=50 mm is established without change in the equivalent focal length (feq) (Step 105) and the procedure goes to Step 98. If the equivalent focal length (feq) is not smaller than 100 mm, the pseudo zooming and the optical zooming is performed until foz=100 mm is established without change in the equivalent focal length (feq) (Step 106). Then, the second projection pattern 63 is set in place for auxiliary lighting (Step 107). Simultaneously, the center light emitting chip only is turned ON as the optical zooming focal length (foz) is 100 mm (Step 108). The procedure now goes to Step 100.

Figure 18:
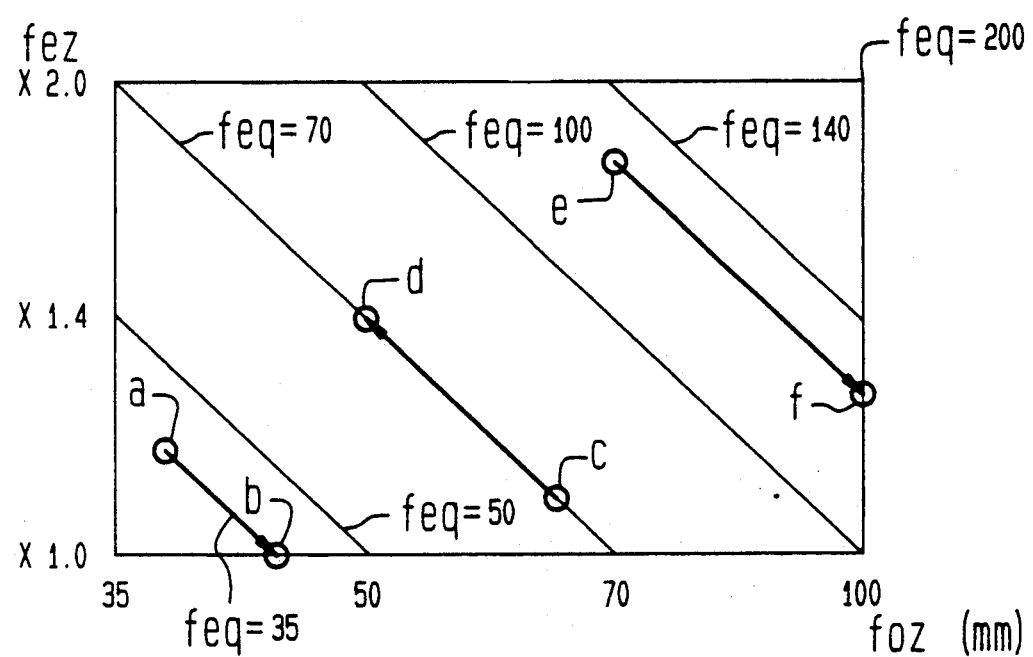
FIG. 18 is a diagram showing the relation between foz, fez, and feq in a zooming process with auxiliary lighting.

FIG. 18 shows the relation between foz, fez, and feq during a zooming process with auxiliary lighting. The pseudo zooming and the optical zooming are performed through varying fez and foz in combination e.g. from the point (a) to the point (b), from the point (c) to the point (d), or from the point (e) to the point (f) while the equivalent focal length (feq) remains unchanged.

The variation of an AF control area size with automatic operation of optical zooming and pseudo zooming corresponding to the distance to, the moving speed of, and the moving direction of the object to be taken will be explained referring to FIGS. 19 and 20.

Figure 19:
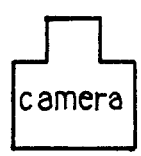
FIG. 19 is a diagram showing size variations of an AF control area corresponding to conditions of the object to be taken.

As shown in FIG. 19, the AF control area can be varied in size through calculation of an AF area change algorithm corresponding to variations in the object magnification β, the moving speed of the object, and the movement of the camera. If the object magnification β is small, as the object appears relatively small in the effective exposure area, the AF control area is reduced to a smaller size. If the object magnification β is great, as the object appears relatively large in the effective exposure area, the AF control area is increased to a larger size. If the object moves at a lower speed and thus, appears catchable, the AF control area will be decreased in size and if it moves at a higher speed and appears less catchable, will be increased. If the object moves towards the camera or along the optical axis of the camera and thus, appears catchable due to less possibility of deflection, the AF control area will be decreased in size and if it moves at a perpendicular angle to the optical axis of the camera and appears less catchable, will be increased.

The AF control area change algorithm will now be described referring to FIG. 20 in which the horizontal axis is the optical zooming focal length (foz) (from 35 mm to 100 mm) and the vertical axis is the pseudo-zooming magnification (fez) (from ×1 to ×2). The equivalent focal length (feq) is represented by the oblique lines in FIG. 20.

Figure 20:
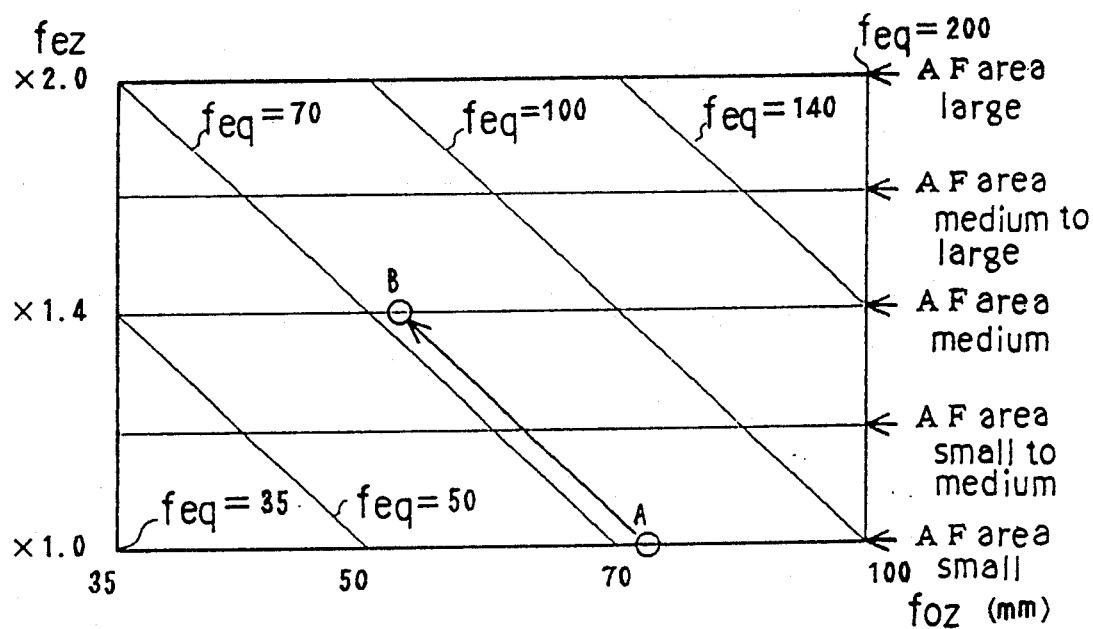
FIG. 20 is a diagram showing the relation between foz, fez, and feq according to an AF area change algorithm.

If the AF area is increased from a small side to a medium side, for example, shifting from the point A to the point B in FIG. 20, both the optical zooming focal length (foz) and the pseudo zooming magnification (fez) can be varied without change of the equivalent focal length (feq). Hence, the distance measuring areas in the effective exposure area are varied in proportion while the equivalent focal length remains unchanged and thus, become increased in the apparent size and more visible for ease of operation.

The panoramic zooming process will be explained referring to FIG. 21.

In common panoramic shooting, the main object to be pictured may appear with a high possibility, not only in a center region of the view finder but also in side end regions because a panoramic photo is increased in width. Hence, the distance measuring areas are preferably extended to both the left and right sides for distance measurement at two side ends. More specifically, the pseudo-zooming magnification (fez) is desirably increased to an effective rate. Meanwhile, in view of the graininess of a photographic film, fez=×1 is preferred considering a printout magnification. It is thus desired that fez is optimum at focusing control and equal to ×1 at release operation (while feq remains unchanged).

Figure 21:
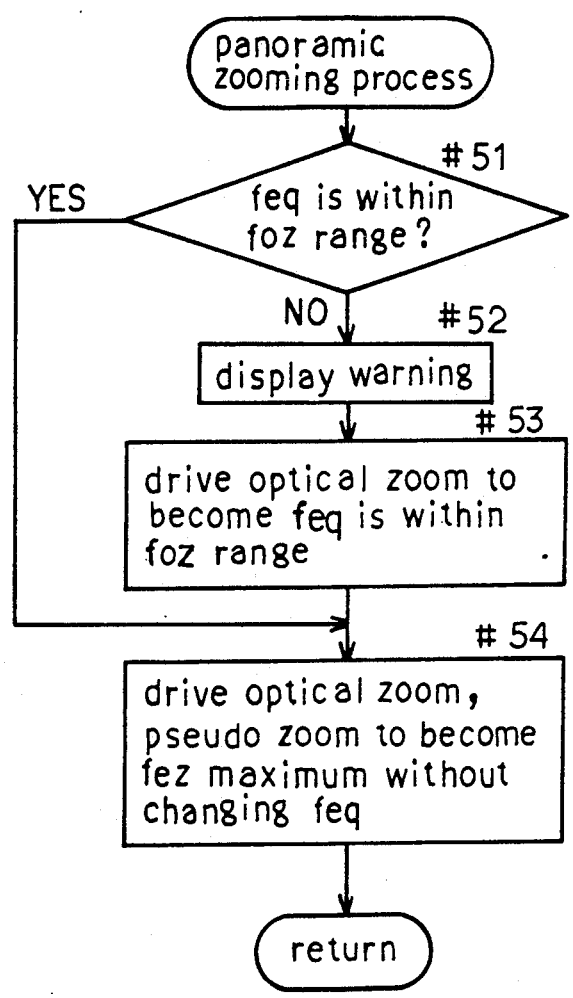
FIG. 21 is a flow chart showing a panoramic zooming process.

As shown in FIG. 21, the equivalent focal length (feq) is judged to determine whether it stays within a range of the optical zooming focal length (foz) or not (Step 51). If not, a warning sign is displayed (Step 52) and the optical zooming is conducted until the equivalent focal length (feq) falls in the range of the optical zooming focal length (foz) (Step 53). If the equivalent focal length (feq) does not stay in the range of the optical zooming focal length (foz), the setting of the pseudo zooming magnification (fez) to ×1 will hardly be carried out with a uniform value of the equivalent focal length (feq). Then, the pseudo zooming and the optical zooming are carried out so that the pseudo zooming magnification (fez) becomes a maximum without change of the equivalent focal length (feq) (Step 54), and the procedure returns. If the equivalent focal length (feq) is found in the range of the optical zooming focal length (foz) at Step 51, the procedure skips over Steps 52 and 53 and advances to Step 54.

Figure 22:
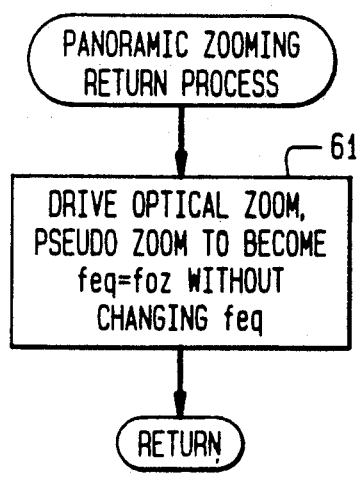
FIG. 22 is a flow chart showing a panoramic zooming return process.

The panoramic zooming return process will be explained referring to FIG. 22. The pseudo zooming and the optical zooming are performed until feq=fez (=×1) is established without change of the equivalent focal length (feq) (Step 61).

Figure 23:
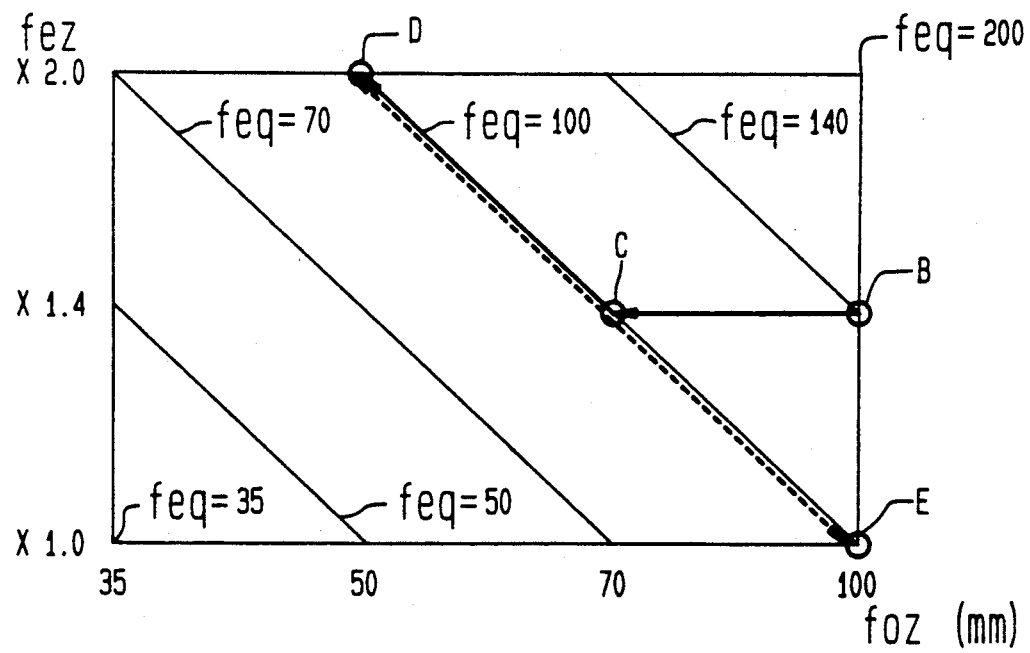
FIG. 23 is a diagram showing the relation between foz, fez, and feq in the panoramic zooming return process.

FIG. 23 illustrates the process of panoramic zooming and its return process. At Step 52, the pseudo zooming and the optical zooming are performed as shifting from the point B (where foz=100 mm, fez=×1.4, and feq=140 mm) to the point C (where foz=70 mm, fez=×1.4, and feq=100 mm) so that the equivalent focal length (feq) falls in the range of the optical zooming focal length (foz). It is further shifted from the point C to the point D (where foz=50 mm, fez=×2, and feq=100 mm) while the equivalent focal length (feq) remains unchanged (Step 54). After focusing control at the point D, it is moved to the point E (where foz=100 mm, fez=×1, and feq=100 mm) so that the pseudo-zooming magnification (fez) becomes ×1 with no change of the equivalent focal length (feq) (Step 61) and the release is carried out at the point E.

The continuous zooming will be explained referring to FIGS. 24 to 26.

If the object to be taken is a moving object and AF locked after focusing operation, a resultant photo may exhibit out of focus due to an abrupt movement of the object before shutter releasing. Therefore, the continuous mode is preferred which allows the focusing control to be continued after correct focusing is given. FIGS. 24-a, 24-b, and 24-c illustrate printed samples in which the pseudo-zooming magnification (fez) and the size of the distance measuring areas are changed. If the distance measuring areas are small as shown in FIG. 24-a, two objects in the finder screen will hardly be captured for focusing. When the pseudo-zooming magnification (fez) is increased, the distance measuring areas become large enough to ease focusing as shown in FIG. 24-b or 24-c.

Figure 25:
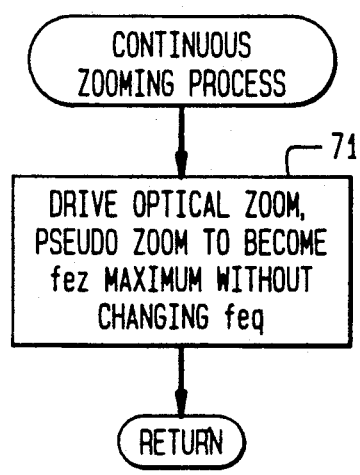
FIG. 25 is a flow chart showing a continuous zooming process.
Figure 26:
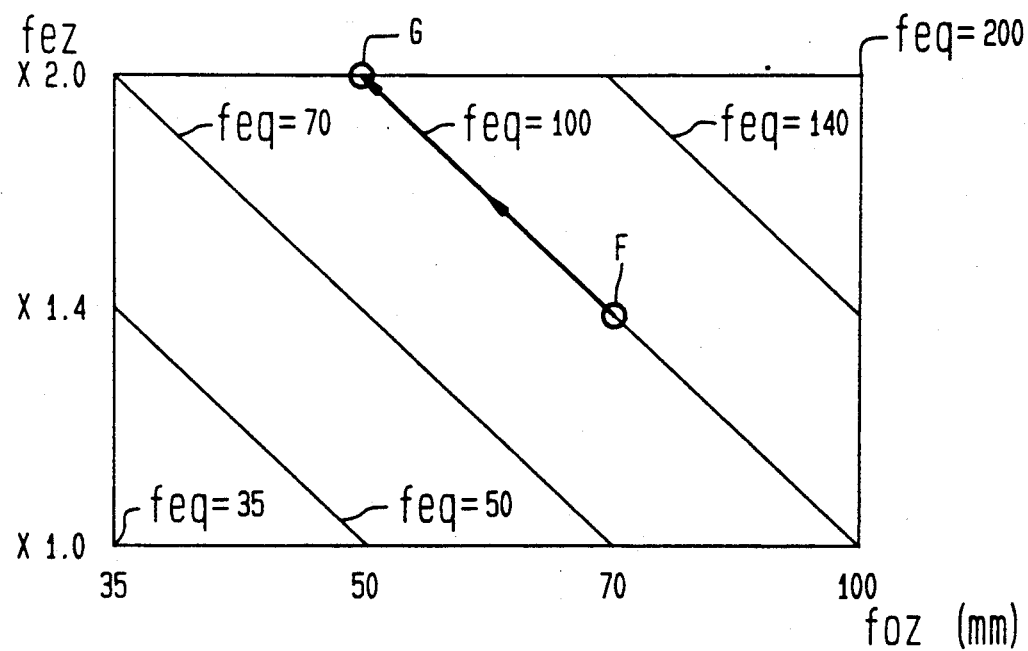
FIG. 26 is a diagram showing the relation between foz, fez, and feq in the continuous zooming process.

In the continuous mode, the pseudo zooming and the optical zooming are carried out so that the pseudo-zooming magnification (fez) becomes maximum while the equivalent focal length (feq) remains unchanged (Step 71), as shown in FIG. 25. More particularly, the continuous zooming process is executed through shifting from the point F (where foz=70 mm, fez=×1.4, and feq=100 mm) in FIG. 26 to the point G (where foz=50 mm, fez=×2, and feq=100 mm) so that the pseudo-zooming magnification (fez) is increased to a maximum. Accordingly, the distance measuring areas can be increased in the size without change of the equivalent focal length (feq).

Figure 27:
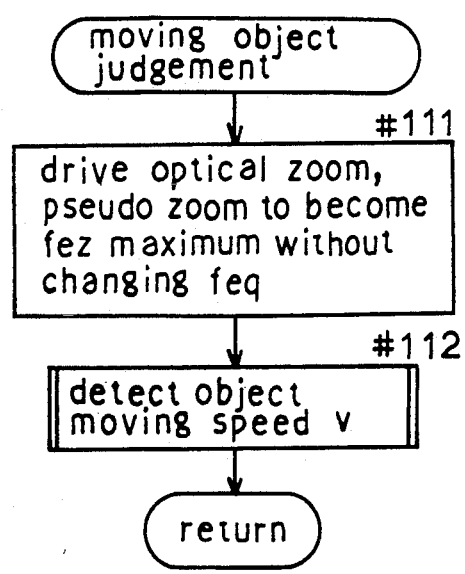
FIG. 27 is a flow chart showing a moving object detecting process.

The moving object detection will now be explained referring to FIG. 27. First, the pseudo zooming and the optical zooming are executed so that the pseudo-zooming magnification (fez) becomes maximum without change of the equivalent focal length (feq) (Step 111). As the result, the size of the distance measuring areas is increased enough to cover the movement of an object to be detected. Then, the moving speed (v) of the object is measured (Step 112) and the procedure returns.

What is claimed is:

1. An auto focus camera that operates in a first photographing mode and a second photographing mode wherein a printed picture for a film exposed in the first photographing mode has a different object field and aspect ratio from a printed picture for a film exposed in the second photographing mode, comprising:

means for selecting one of the first and second photographing modes;

means for detecting focus conditions with respect to a plurality of focus detection areas, said detecting means detecting the focus conditions with respect to the same focus detection areas irrespective of the selected photographing mode;

means for deciding upon one focus condition to be used in an auto focus operation from among the plurality of detected focus conditions, said deciding means carrying out its operation in a first manner when the first photographing mode is selected and carrying out its operation in a second manner different from the first manner when the second photographing mode is selected; and means for driving a photographing lens on the basis of the focus condition which was decided upon.

2. An auto focus camera as claimed in claim 1, wherein all of the focus detection areas are inside of the object fields for both the first and second photographing modes.

3. An auto focus camera as claimed in claim 1, wherein the first photographing mode is a normal photographing mode and the second photographing mode is a panoramic photographing mode.

4. An auto focus camera that operates in a first photographing mode and a second photographing mode wherein a printed picture for a film exposed in the first photographing mode has a different object field and aspect ratio from a printed picture for a film exposed in the second photographing mode, comprising:

means for selecting one of the first and second photographing modes;

means for detecting information relating to object distance with respect to a plurality of detection areas, said detecting means detecting the information with respect to the same detection areas irrespective of the selected photographing mode;

means for deciding which information from the plurality of detection areas to use in a auto focus operation, said deciding means carrying out its operation in a first manner when the first photographing mode is selected and carrying out its operation in a second manner different from the first manner when the second photographing mode is selected; and means for driving a photographing lens on the basis of the information that was decided upon.

5. An auto focus camera as claimed in claim 4, wherein all of the detection areas are inside of the object fields for both the first and second photographing modes.

6. An auto focus camera as claimed in claim 4, wherein the first photographing mode is a normal photographing mode and the second photographing mode is a panoramic photographing mode.

* * * * *